United States Patent
Fleck et al.

(10) Patent No.: US 10,860,118 B2
(45) Date of Patent: Dec. 8, 2020

(54) METHOD USING ACTIVE STYLUS AND SENSOR CONTROLLER, SENSOR CONTROLLER, ACTIVE STYLUS, AND SYSTEM

(71) Applicant: Wacom Co., Ltd., Saitama (JP)

(72) Inventors: David Charles Fleck, Vancouver, WA (US); Sadao Yamamoto, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 181 days.

(21) Appl. No.: 15/715,860

(22) Filed: Sep. 26, 2017

(65) Prior Publication Data
US 2018/0018031 A1 Jan. 18, 2018

Related U.S. Application Data

(63) Continuation of application No. PCT/JP2016/058892, filed on Mar. 22, 2016.
(Continued)

(51) Int. Cl.
*G06F 3/0354* (2013.01)
*G06F 3/044* (2006.01)
*G06F 3/041* (2006.01)

(52) U.S. Cl.
CPC ...... *G06F 3/03545* (2013.01); *G06F 3/03547* (2013.01); *G06F 3/044* (2013.01); *G06F 3/0418* (2013.01)

(58) Field of Classification Search
CPC ............. G06F 3/03545; G06F 3/03547; G06F 3/0418; G06F 3/044; G06F 3/0442; G06F 3/04184; G06F 3/0441; G06F 3/0446
See application file for complete search history.

(56) References Cited

U.S. PATENT DOCUMENTS 5,736,980 A 4/1998 Iguchi et al.
7,278,018 B2 10/2007 Lapstun et al.
(Continued)

FOREIGN PATENT DOCUMENTS

JP 2014-63249 A 4/2014
WO 2015/111159 A1 7/2015

OTHER PUBLICATIONS

Final Rejection, dated Dec. 22, 2016, for U.S. Appl. No. 15/069,852, Fleck et al., "System and Method for Bidirectional Communication Between Stylus and Stylus Sensor Controller," 18 pages.
(Continued)

*Primary Examiner* — Abhishek Sarma
(74) *Attorney, Agent, or Firm* — Seed IP Law Group LLP

(57) ABSTRACT

A method is provided for using an active stylus and a sensor controller that engage in two-way communication with each other. The sensor controller sends a beacon signal BS indicating reference time of a frame F. After detecting the beacon signal BS, the active stylus sends, included in a response signal to the beacon signal BS, a hash value CP_Hash associated with capability information indicating the type of one or more pieces of interactive data DF that can be obtained by the active stylus. The active stylus periodically sends data signals DF1,DF2, and so on, which include at least part of the one or more pieces of interactive data DF and which are configured in a format determined based on the one or more pieces of interactive data DF.

23 Claims, 13 Drawing Sheets

| TBL1 CAPABILITY INFORMATION CP ||||
|---|---|---|---|
| INFORMATION NAME | ESSENTIAL | TRANSMISSION SIZE | REMARKS |
| VENDOR IDENTIFIER (VID) | Y | 8 BITS | |
| SERIAL NUMBER (SN) | Y | 56 BITS | ASSIGNED BY VENDOR |
| COLOR (Col) | Y or N | 8 BITS | CSS COLOR WITH 140 COLORS |
| STYLE (Styl) | N | 3 BITS | |
| STATE OF TAIL BUTTON 111 | — | N/A | |
| VERSION (Ver) | N or Y | 4 BITS | |
| DATA FORMAT (DFmt) | Y | 10 TO 44 BITS | REFER TO FIG. 6 TO FIG. 8 |

Related U.S. Application Data

(60) Provisional application No. 62/243,427, filed on Oct. 19, 2015, provisional application No. 62/162,527, filed on May 15, 2015, provisional application No. 62/149,907, filed on Apr. 20, 2015.

(56) References Cited

U.S. PATENT DOCUMENTS

| | | |
|---|---|---|
| 2006/0010368 A1 | 1/2006 | Kashi |
| 2006/0109252 A1 | 5/2006 | Kolmykov-Zotov et al. |
| 2008/0143691 A1 | 6/2008 | Cook |
| 2008/0158165 A1 | 7/2008 | Geaghan et al. |
| 2008/0169132 A1 * | 7/2008 | Ding ............... G06F 3/03545 178/19.02 |
| 2009/0139780 A1 | 6/2009 | Katsurahira et al. |
| 2010/0155153 A1 | 6/2010 | Zachut |
| 2010/0315384 A1 | 12/2010 | Hargreaves et al. |
| 2011/0193776 A1 | 8/2011 | Oda et al. |
| 2012/0206349 A1 | 8/2012 | Nowatzyk et al. |
| 2012/0237140 A1 | 9/2012 | Lapstun et al. |
| 2012/0242603 A1 | 9/2012 | Engelhardt et al. |
| 2012/0331546 A1 | 12/2012 | Falkenburg et al. |
| 2013/0093683 A1 | 4/2013 | Hu et al. |
| 2013/0106722 A1 | 5/2013 | Shahparnia et al. |
| 2013/0106760 A1 | 5/2013 | Pedersen et al. |
| 2013/0113763 A1 | 5/2013 | Nungester et al. |
| 2014/0078101 A1 | 3/2014 | Katsurahira |
| 2014/0184567 A1 | 7/2014 | Zachut |
| 2014/0253462 A1 | 9/2014 | Hicks |
| 2014/0256250 A1 | 9/2014 | Cueto et al. |
| 2014/0340318 A1 | 11/2014 | Stringer |
| 2015/0009187 A1 | 1/2015 | Mercea et al. |
| 2015/0035797 A1 | 2/2015 | Shahparnia |
| 2015/0049028 A1 | 2/2015 | Pollmann et al. |
| 2015/0116271 A1 | 4/2015 | Shahparnia et al. |
| 2015/0153845 A1 | 6/2015 | Chang et al. |
| 2015/0205367 A1 | 7/2015 | Bandt-Horn |
| 2015/0277587 A1 | 10/2015 | Chandran et al. |
| 2015/0346890 A1 | 12/2015 | Zachut |
| 2015/0363012 A1 | 12/2015 | Sundara-Rajan et al. |
| 2015/0363067 A1 | 12/2015 | Winebrand |
| 2016/0014598 A1 | 1/2016 | Westhues |
| 2016/0246390 A1 | 8/2016 | Lukanc et al. |
| 2016/0320918 A1 | 11/2016 | Hara |

OTHER PUBLICATIONS

International Search Report and Written Opinion, dated Aug. 25, 2016, for International Application No. PCT/US2016/027316, 13 pages.

Notice of Allowance, dated May 24, 2016, for U.S. Appl. No. 15/069,793, Fleck et al., "System and Method for Bidirectional Communication Between Stylus and Stylus Sensor Controller," 12 pages.

Non-Final Office Action, dated Jan. 26, 2018, for U.S. Appl. No. 15/727,182, Fleck et al., "System and Method for Bidirectional Communication Between Stylus and Stylus Sensor Controller," 10 pages.

* cited by examiner

FIG. 5

TBL1

| CAPABILITY INFORMATION CP | | | |
|---|---|---|---|
| INFORMATION NAME | ESSENTIAL | TRANSMISSION SIZE | REMARKS |
| VENDOR IDENTIFIER (VID) | Y | 8 BITS | |
| SERIAL NUMBER (SN) | Y | 56 BITS | ASSIGNED BY VENDOR |
| COLOR (Col) | Y or N | 8 BITS | CSS COLOR WITH 140 COLORS |
| STYLE (Styl) | N | 3 BITS | |
| STATE OF TAIL BUTTON 111 | — | N/A | |
| VERSION (Ver) | N or Y | 4 BITS | |
| DATA FORMAT (DFmt) | Y | 10 TO 44 BITS | REFER TO FIG. 6 TO FIG. 8 |

FIG. 6

| DATA FORMAT DFmt | | |
|---|---|---|
| NAME | TRANSMISSION SIZE | DEFINITION |
| NUMBER OF PEN PRESSURE READING LEVELS (PL) | 3 BITS | DEFINED SEPARATELY BY CPS WHEN PL=7. IN OTHER CASES, NUMBER OF PEN PRESSURE LEVELS=256*$2^{PL}$ |
| NUMBER OF BARREL BUTTONS (BBN) | 2 BITS | DEFINED SEPARATELY BY CBS WHEN BBN=3. IN OTHER CASES, NUMBER OF BARREL BUTTONS=BBN |
| TANGENTIAL PEN PRESSURE FLAG (TaPf) | 1 BIT | NOT CAPABLE WHEN TaPf=0, CAPABLE WHEN TaPf=1 (NUMBER OF LEVELS IS THE SAME AS PL) |
| ORIENTATION CODE (ORC) | 3 BITS | INDICATES ORIENTATION OR FORMAT. WHEN ORC=7, ONLY DATA SIZE IS DEFINED SEPARATELY BY COS. IN OTHER CASES, REFER TO FIG. 7. |
| CUSTOM DATA FLAG (CDf) | 1 BIT | NO CUSTOM DATA WHEN CDf=0, CUSTOM DATA WHEN CDf=1 |
| ORIENTATION RESOLUTION (ORR) | 0 TO 2 BITS | (INCLUDED ONLY WHEN ORC>0) RESOLUTION=(8+ORR) BITS |
| CUSTOM PEN PRESSURE SIZE (CPS) | 0 or 8 BITS | (INCLUDED ONLY WHEN PL=7) NUMBER OF PEN PRESSURE LEVELS=CPS |
| CUSTOM BUTTON SIZE (CBS) | 0 or 8 BITS | (INCLUDED ONLY WHEN BBN=3) NUMBER OF BARREL BUTTONS=CBS (UP TO 256) |
| CUSTOM ORIENTATION SIZE (COS) | 0 or 8 BITS | (INCLUDED ONLY WHEN ORC=7) NUMBER OF ORIENTATION OR BYTES=COS |
| CUSTOM DATA SIZE (CDS) | 0 or 8 BITS | (INCLUDED ONLY WHEN CDf=1) NUMBER OF CUSTOM DATA CD BYTES=CDS |

FIG. 7

OCT

| ORC | TYPE OF ORIENTATION OR | DATA SIZE (NUMBER OF EXCLUSIVELY USED TIME SLOTS) |
|---|---|---|
| 0 | – | 0 |
| 1 | X TILT, Y TILT (2D) | 2 |
| 2 | X TILT, Y TILT, TWIST (3D) | 3 |
| 3 | ALTITUDE, AZIMUTH (2D) | 2 |
| 4 | ALTITUDE, AZIMUTH, TWIST (3D) | 3 |
| 5 | 6-AXIS INERTIAL MEASUREMENT UNIT (ACCELEROMETER & GYRO) | 3 |
| 6 | 9-AXIS INERTIAL MEASUREMENT UNIT | 3 OR MORE |
| 7 | CUSTOM | DEFINED BY COS |

FIG. 8

EXAMPLE 1 OF DESCRIPTION OF DATA FORMAT DFmt
```
010      // NUMBER OF PEN PRESSURE READING LEVELS PL IS 1024
01       // NUMBER OF BARREL BUTTONS BBN IS 1
0        // TANGENTIAL PEN PRESSURE NOT CAPABLE
000      // ORIENTATION OR NOT CAPABLE
(0       // NO CUSTOM DATA)
```
(a)

EXAMPLE 2 OF DESCRIPTION OF DATA FORMAT DFmt
```
011      // NUMBER OF PEN PRESSURE READING LEVELS PL IS 2048
10       // NUMBER OF BARREL BUTTONS BBN IS 2
1        // TANGENTIAL PEN PRESSURE CAPABLE
110      // ORIENTATION OR REPRESENTS MEASUREMENT RESULT OF 9-AXIS INERTIAL MEASUREMENT UNIT
(0       // NO CUSTOM DATA)
```
(b)

EXAMPLE 3 OF DESCRIPTION OF DATA FORMAT DFmt
```
111      // NUMBER OF PEN PRESSURE READING LEVELS PL IS DEFINED BY CPS
00       // NUMBER OF BARREL BUTTONS BBN IS 0
0        // TANGENTIAL PEN PRESSURE NOT CAPABLE
100      // ORIENTATION OR REPRESENTS ALTITUDE, AZIMUTH, AND TWIST
00000100 // NUMBER OF PEN PRESSURE READING LEVELS PL IS 16
```
(c)

FIG.9

TBL2

| INTERACTIVE DATA DF | | | |
|---|---|---|---|
| NAME | ESSENTIAL | TRANSMISSION SIZE | REMARKS |
| PEN PRESSURE VALUE (TiP) | Y | 8 TO 256 BITS | TYPICALLY 8 TO 11 BITS |
| TANGENTIAL PEN PRESSURE VALUE (TaP) | N | 0 TO 256 BITS | TYPICALLY 0 BIT |
| BARREL BUTTON STATE(BB) | Y | 2 TO 256 BITS | TYPICALLY 2 BITS |
| INVERSION (Inv) | Y | 1 BIT | |
| ORIENTATION (OR) | N | 0 TO 72 BITS | ADDITIONAL TIME SLOTS USED |
| CUSTOM DATA (CD) | N | 0 TO 256 BITS | |

FIG.10

TBL3

| NONINTERACTIVE DATA DINF | | | |
|---|---|---|---|
| NAME | ESSENTIAL | TRANSMISSION SIZE | REMARKS |
| BATTERY LEVEL (BL) | Y | 4 BITS | |
| ⋮ | ⋮ | ⋮ | ⋮ |

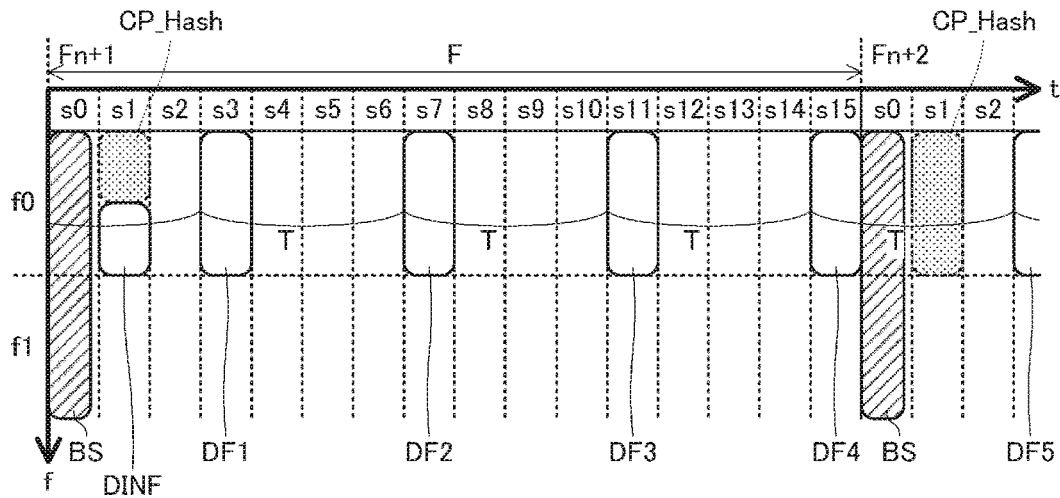

METHOD USING ACTIVE STYLUS AND SENSOR CONTROLLER, SENSOR CONTROLLER, ACTIVE STYLUS, AND SYSTEM

BACKGROUND

Technical Field

The present disclosure relates to a method using an active stylus and a sensor controller, a sensor controller, an active stylus, and a system.

Description of the Related Art

A position detecting device is known that is capable of sending signals through capacitive coupling from an active stylus (hereinafter may be referred to simply as a "stylus"), which is a position pointer with a built-in power supply device, to a tablet. In this kind of position detecting device, one-way communication takes place in which signals are sent from the stylus and received by a sensor controller of the tablet. Patent Document 1 discloses, as an example of such a position detecting device, a stylus that communicates data such as pen pressure value, unique stylus identifier (ID), and other information together with a position signal dedicated for deriving coordinate data.

Patent Document 2 discloses another example of a position detecting device. The stylus according to this example includes an electrode for signal transmission and a battery, and sends results of detection of pen pressure in a digital form. Also, the tablet includes a display device and a transparent sensor so that both the position pointed to by the stylus and the pen pressure applied by the stylus and the position touched by a finger can be detected by the transparent sensor.

PRIOR ART DOCUMENT

Patent Documents

Patent Document 1: PCT Patent Publication No. 2015/111,159
Patent Document 2: Japanese Patent Laid-Open No. 2014-63249

BRIEF SUMMARY

Technical Problem

Styluses in recent years are diversified, with some configured to be able to obtain various interactive data, and others unable to detect a pen pressure value and able to send only a position signal dedicated for deriving coordinate data. Interactive data is data obtained as a result of stylus operation by a user and includes, for example, a pen pressure value, orientation (direction of a stylus), a pressed state of a barrel button (operating button provided on the side surface of the stylus), and so on. Because interactive data is data that changes frequently, the stylus is configured to periodically send interactive data, obtained by its own sensor, to the sensor controller together with a position signal dedicated for deriving coordinate data.

However, conventional systems including a stylus and a sensor controller had a problem in that interactive data could not be sent efficiently by the stylus depending on a particular stylus functionality. That is, in conventional systems, the format of data sent from the stylus to the sensor controller was fixed in advance. Therefore, it was difficult to flexibly change the format of data to be sent according to the functionality of each stylus and to distinguish between data, which changes frequently with use of the stylus, and data or information that remains almost unchanged, often resulting in inefficient transmission.

Therefore, it is an aspect of the present disclosure to provide a method using an active stylus and a sensor controller, a sensor controller, an active stylus, and a system that allow for efficient transmission of interactive data from the active stylus to the sensor controller.

Technical Solution

A method according to an aspect of the present disclosure is a method using an active stylus and a sensor controller that engage in two-way communication with each other. The method includes a step in which the sensor controller sends a beacon signal indicating reference time of a frame used to carry out the two-way communication, a step in which after detecting the beacon signal, the active stylus sends, included in a response signal to the beacon signal, information associated with capability information indicating a type of one or more pieces of interactive data that can be obtained by the active stylus, and a step in which the active stylus periodically sends a data signal that includes at least part of the one or more pieces of interactive data and that is configured in a format determined based on the one or more pieces of interactive data.

A sensor controller according to an aspect of the present disclosure is a sensor controller that engages in two-way communication with an active stylus. The sensor controller sends a beacon signal indicating reference time of a frame used to carry out the two-way communication, and receives, from the active stylus, a response signal including information associated with capability information indicating a type of one or more pieces of interactive data that can be obtained by the active stylus. The sensor controller periodically receives, from the active stylus, a data signal that includes at least part of the one or more pieces of interactive data and that is configured in a format determined based on the one or more pieces of interactive data.

An active stylus according to an aspect of the present disclosure is an active stylus that engages in two-way communication with a sensor controller. The active stylus, after receiving a beacon signal indicating reference time of a frame used to carry out the two-way communication from the sensor controller, sends, included in a response signal to the beacon signal, information associated with capability information indicating a type of one or more pieces of interactive data that can be obtained by the active stylus. The active stylus periodically sends a data signal that includes at least part of the one or more pieces of interactive data and that is configured in a format determined based on the one or more pieces of interactive data.

A system according to an aspect of the present disclosure is a system that includes an active stylus and a sensor controller that engage in two-way communication with each other. The sensor controller sends a beacon signal indicating reference time of a frame used to carry out the two-way communication. After detecting the beacon signal, the active stylus sends, included in a response signal to the beacon signal, information associated with capability information indicating a type of one or more pieces of interactive data that can be obtained by the active stylus. The active stylus periodically sends a data signal that includes at least part of the one or more pieces of interactive data and that is configured in a format determined based on the one or more pieces of interactive data.

Advantageous Effect

According to the present disclosure, a data signal periodically sent in a format, which is determined based on one or more pieces of interactive data that can be obtained by an active stylus having a sensor function, does not include capability information that remains unchanged with stylus operation but includes data that frequently changes with stylus operation, making it possible to send one or more pieces of interactive data efficiently from the active stylus to a sensor controller.

BRIEF DESCRIPTION OF THE SEVERAL VIEWS OF THE DRAWINGS

FIG. 5 is a diagram illustrating a configuration of capability information CP depicted in FIG. 3.

FIG. 6 is a diagram illustrating details of data format DFmt depicted in FIG. 5.

FIG. 7 is a diagram illustrating a definition of an orientation code ORC depicted in FIG. 6.

FIG. 8 depicts diagrams illustrating examples of the data format DFmt depicted in FIG. 5.

FIG. 9 is a diagram illustrating a configuration of interactive data DF depicted in FIG. 3.

FIG. 10 is a diagram illustrating a configuration of noninteractive data DINF depicted in FIG. 3.

FIG. 16 is a diagram illustrating another example of allocation of time slots to the interactive data DF and the noninteractive data DINF.

FIG. 17 is a diagram illustrating an example of allocation of time slots to the interactive data DF and the noninteractive data DINF when the interactive data DF includes custom data CD.

FIG. 18 is a diagram illustrating an example of allocation of time slots and frequencies to the interactive data DF and the noninteractive data DINF when the interactive data DF includes an orientation OR.

DETAILED DESCRIPTION

A detailed description will be given below of embodiments of the present disclosure with reference to the accompanying drawings.

Figure 1:
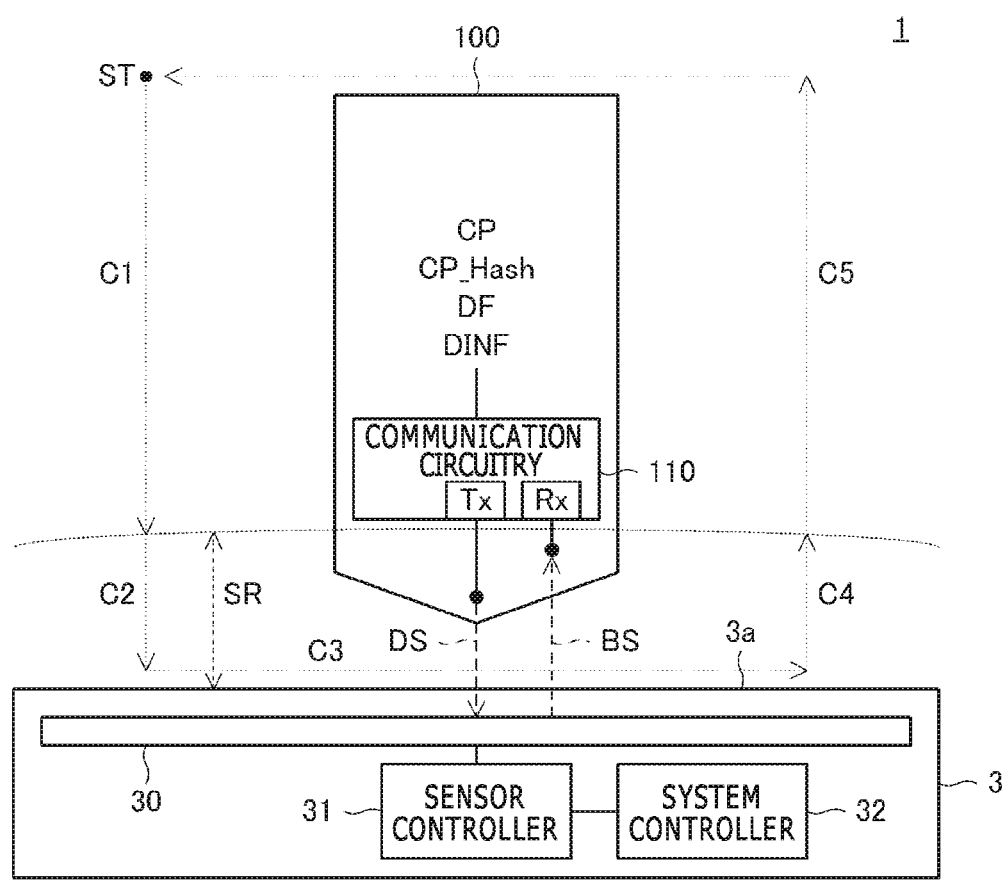
FIG. 1 is a diagram illustrating a configuration of a system according to a first embodiment of the present disclosure.

FIG. 1 is a diagram illustrating a configuration of a system 1 according to a first embodiment of the present disclosure. The system 1 includes a stylus 100 and a sensor controller 31 included in an electronic apparatus 3. Of these, the stylus 100 is configured to include a communication circuitry 110 having a function to send and receive various data (e.g., capability information CP, hash value CP_Hash, interactive data DF, noninteractive data DINF, and beacon signal BS to be described later). On the other hand, the electronic apparatus 3 is configured to include not only the sensor controller 31 but also a sensor 30, which forms a touch surface 3a of the electronic apparatus 3, and a system controller 32 that controls functions of the respective circuitry of the electronic apparatus 3 including the sensor 30 and the sensor controller 31. The sensor controller 31 is configured to engage in two-way communication with the stylus 100 using frames by capacitively coupling with the stylus 100 via the sensor 30.

Broken line arrows C1 to C5 in FIG. 1 indicate a typical cycle in which the user operates the stylus 100. When using the stylus 100, the user operates a tail switch 103 (refer to FIG. 3) first and specifies a color Col and a style Styl (refer to FIG. 5) of a line drawn by the stylus 100. Then, to actually draw a line, the user repeats a series of cycles that include moving (lowering) the stylus 100 from outside a sensing range SR (range within which the sensor controller 31 can detect the stylus 100) into the sensing range SR (C1, C2), moving the stylus 100 on the touch surface 3a in such a manner as to trace a desired path (C3), and moving (raising) the stylus 100 from inside the sensing range SR to outside the sensing range SR (C4, C5). As the user repeats these cycles, a condition occurs in which the stylus 100 repeatedly moves into and out of the sensing range SR of the sensor controller 31.

The sensor controller 31 is a master device that controls the communication that takes place within the system 1 and is configured to send out the beacon signal BS (uplink signal, search signal) that serves as a frame reference time every frame (every frame period interval) using the sensor 30.

Figure 2:
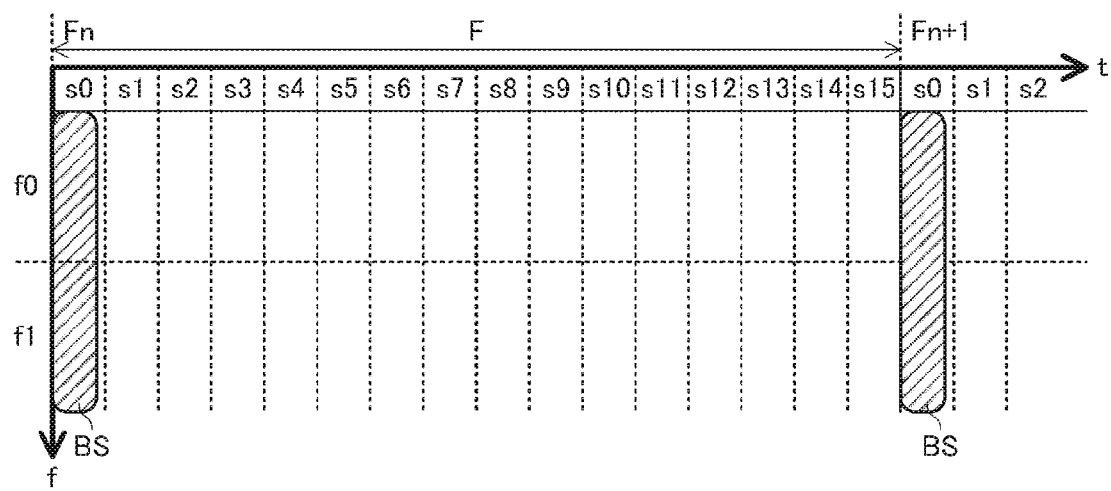
FIG. 2 is a diagram illustrating a configuration of frame F according to the first embodiment of the present disclosure.

FIG. 2 is a diagram illustrating a configuration of frame F according to the present embodiment, depicting the relation between the frame F, the beacon signal BS, and time or a time slot (hereinafter referred to as a "time slot"). As illustrated in the same figure, for example, each of the frames F is made up of 16 (or 32 or other number of) time slots s0 to s15, and the beacon signal BS is sent in the time slot s0 located at the beginning of each frame F. The duration of each frame F is, for example, 16 milliseconds (equivalent to 60 Hz) to match with a liquid crystal refresh rate. Communication through capacitive coupling is narrow band communication, and at most only several tens of bits (e.g., 20 bits) can be sent out in one time slot. It should be noted, however, that assuming that an error detection code (cyclical redundancy check (CRC)) of several bits is attached to signals sent and received in the system 1, the number of bits that can be sent in one time slot is, for example, 16 bits. The description will continue below on the premise that 16 bits can be sent in one unit time or in one time slot.

After sending out the beacon signal BS in the time slot s0, for example, the sensor controller 31 goes on standby to receive a downlink signal DS sent from the stylus 100 in the time slots s1 to s15. When the downlink signal DS is detected, the sensor controller 31 is configured to not only derive coordinate data (X,Y) indicating the position of the stylus 100 based on the positions of electrodes (plurality of linear electrodes 30X and 30Y illustrated in FIG. 4 which will be described later) used for that detection and the reception level of the detected downlink signal DS but also obtain various information and data that was sent, included in the downlink signal DS, from the stylus 100.

Various information and data included in the downlink signal DS and sent from the stylus 100 specifically include the capability information CP illustrated in FIG. 5, the interactive data DF illustrated in FIG. 9, and the noninteractive data DINF illustrated in FIG. 10. Hereinafter, of these, the interactive data DF and the noninteractive data DINF may be referred to as data D. When these pieces of information and data are obtained, the sensor controller 31 supplies these pieces of information and data to the system controller 32 together with position information (X,Y). The system controller 32 is configured to associate the position information (X,Y), the capability information CP, and the data D supplied as described above with each other and supply them to various applications such as drawing application via an operating system that is not depicted. This allows for the position information (X,Y), the capability information CP, and the data D to be used by various applications.

A description will be given here of the outline of the capability information CP and the data D. A detailed description will be given separately later with reference to FIG. 5 to FIG. 10.

First, the capability information CP is information such as version information of the stylus 100 that may change while the stylus 100 is located outside the sensing range SR. In other words, the capability information CP is information that remains unchanged while the user is engaged in writing operation using the stylus 100. The capability information CP also includes information that will never change such as vendor identifier that indicates the vendor (e.g., manufacturer) of the stylus 100. The capability information CP must be known to the sensor controller 31 before various data D is sent from the stylus 100 to the sensor controller 31.

The data D is information that has a possibility to change while the stylus 100 is located within the sensing range SR and includes the interactive data DF and the noninteractive data DINF as described above.

Figure 15:
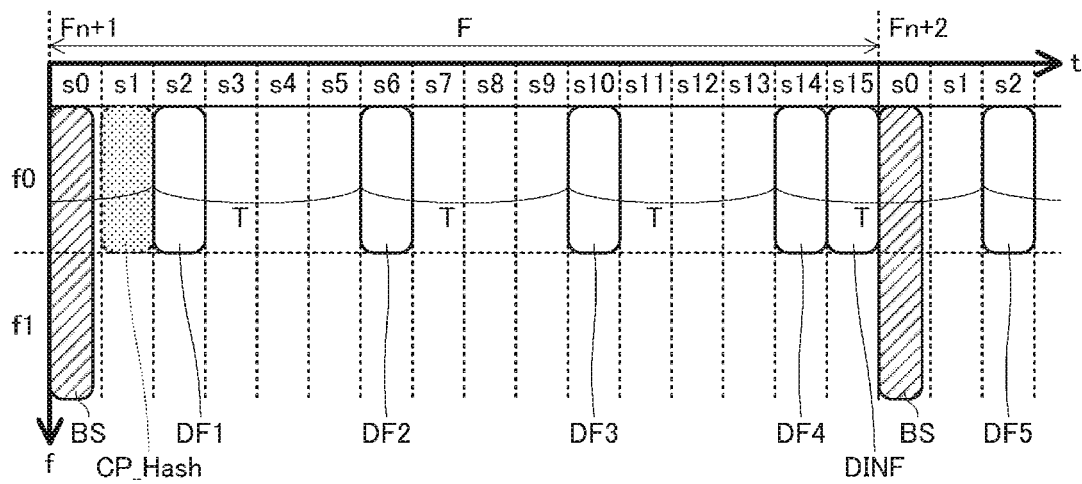
FIG. 15 is a diagram illustrating an example of allocation of time slots to the interactive data DF and the noninteractive data DINF.

The interactive data DF is, for example, data that changes frequently in the middle of operation of the stylus 100 by the user, such as pen pressure value and pressed state of a barrel button, and is sent from the stylus 100 to the sensor controller 31 once or more (commonly a plurality of times) within the single frame F (e.g., 60 Hz) as illustrated in FIG. 15, which will be described later. Also, once a data format is determined, the interactive data DF is sent repeatedly in the determined format in the plurality of frames as long as the stylus and the sensor controller detect each other. In principle, the stylus 100 periodically and repeatedly sends the interactive data DF in the plurality of frames voluntarily (unilaterally) rather than in response to polling from the sensor controller 31. A position signal dedicated for deriving coordinate data is also included as one type of the interactive data DF because the pointed position frequently changes with use of the stylus 100.

The noninteractive data DINF is data that changes less frequently than the interactive data DF like a battery level (or data that may be considered as changing at such a frequency) and that is sent once every plurality of frames F (e.g., every several hundred frames). In principle, the stylus 100 sends the noninteractive data DINF in response to polling (request to send) from the sensor controller 31 rather than voluntarily.

Figure 3:
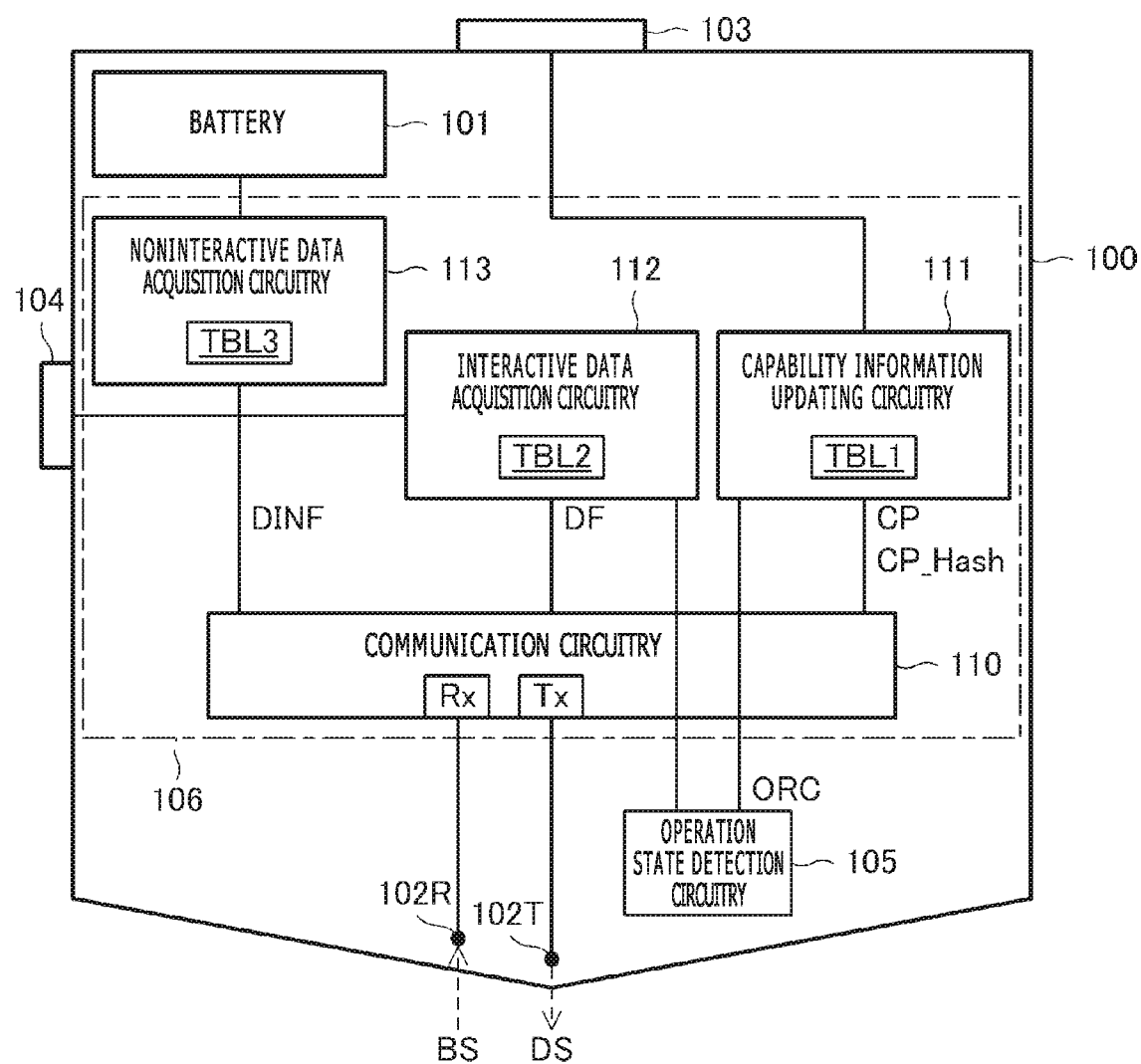
FIG. 3 is a diagram illustrating a configuration of a stylus depicted in FIG. 1.

FIG. 3 is a diagram illustrating a configuration of the stylus 100. As illustrated in the same figure, the stylus 100 includes a battery 101, electrodes 102T and 102R, the tail switch 103, a barrel button 104, an operation state detection circuitry 105, and a stylus controller integrated circuit (IC) 106.

The battery 101 is a power supply device that supplies power to drive the stylus controller IC 106 and is configured to supply a signal that indicates its own remaining capacity level (battery level BL depicted in FIG. 10) to the stylus controller IC 106.

The operation state detection circuitry 105 detects information included in the interactive data DF and may include, for example, a detection circuit that detects a pen pressure value (pen pressure value TiP depicted in FIG. 9 which will be described later) applied to the tip of the stylus 100, and a sensor device such as six-axis inertial measurement unit (IMU) that detects an orientation (direction; orientation OR depicted in FIG. 9 which will be described later) of the stylus 100. The operation state detection circuitry 105 is configured to notify, regarding the sensor device that detects the orientation, information for identifying an orientation code ORC (refer to FIG. 6) indicating the detectable orientation type, to the capability information updating circuitry 111 in the stylus controller IC 106. It should be noted that the orientation code ORC includes information indicating whether or not the operation state detection circuitry 105 has a sensor device that detects the orientation.

The stylus controller IC 106 is configured to functionally include the communication circuitry 110, the capability information updating circuitry 111, an interactive data acquisition circuitry 112, and a noninteractive data acquisition circuitry 113.

The communication circuitry 110 includes a receiving circuit Rx and a transmitting circuit Tx and engages in two-way communication based on a plurality of time slots specified in accordance with the reference time (starting time) of the frame F illustrated in FIG. 2. Describing more specifically, the communication circuitry 110 detects the beacon signal BS using the electrode 102R to derive the reference time of the frame F and sets the reference times of the time slots s0 to s15 depicted in FIG. 2 or adjusts synchronization. Then, the communication circuitry 110 is supplied with the capability information CP, the interactive data DF, and the noninteractive data DINF respectively from the capability information updating circuitry 111, the interactive data acquisition circuitry 112, and the noninteractive data acquisition circuitry 113 and sends, from the electrode 102T, these pieces of information and data in the downlink signal DS in the time slots s1 to s15 that are used for transmission of the downlink signal DS in accordance with the determined format as depicted, for example, in FIG. 6.

The capability information updating circuitry 111 has a function to manage the capability information CP. Specifically, the capability information updating circuitry 111 is configured to maintain the capability information CP in a register (not depicted), update the capability information CP to match with details of operation of the tail switch 103 by the user (e.g., number of times switch-ON operation is performed) and supply the updated capability information CP to the communication circuitry 110. The capability information CP updated as described above includes a color Col and a style Styl depicted in FIG. 5.

The interactive data acquisition circuitry 112 has a function to manage the interactive data DF. Specifically, each time data included in the interactive data DF is sent, the interactive data acquisition circuitry 112 is configured to obtain each of a pen pressure value TiP, the orientation OR and so on depicted in FIG. 9 from the operation state detection circuitry 105, and obtain the pressed state of the barrel button 104 (barrel button state BB depicted in FIG. 9), and supply the data to the communication circuitry 110.

The noninteractive data acquisition circuitry 113 has a function to manage the noninteractive data DINF. Specifically, each time the noninteractive data DINF is sent, the noninteractive data acquisition circuitry 113 is configured to obtain a battery level BL depicted in FIG. 10 and so on and supply the data to the communication circuitry 110.

Figure 4:
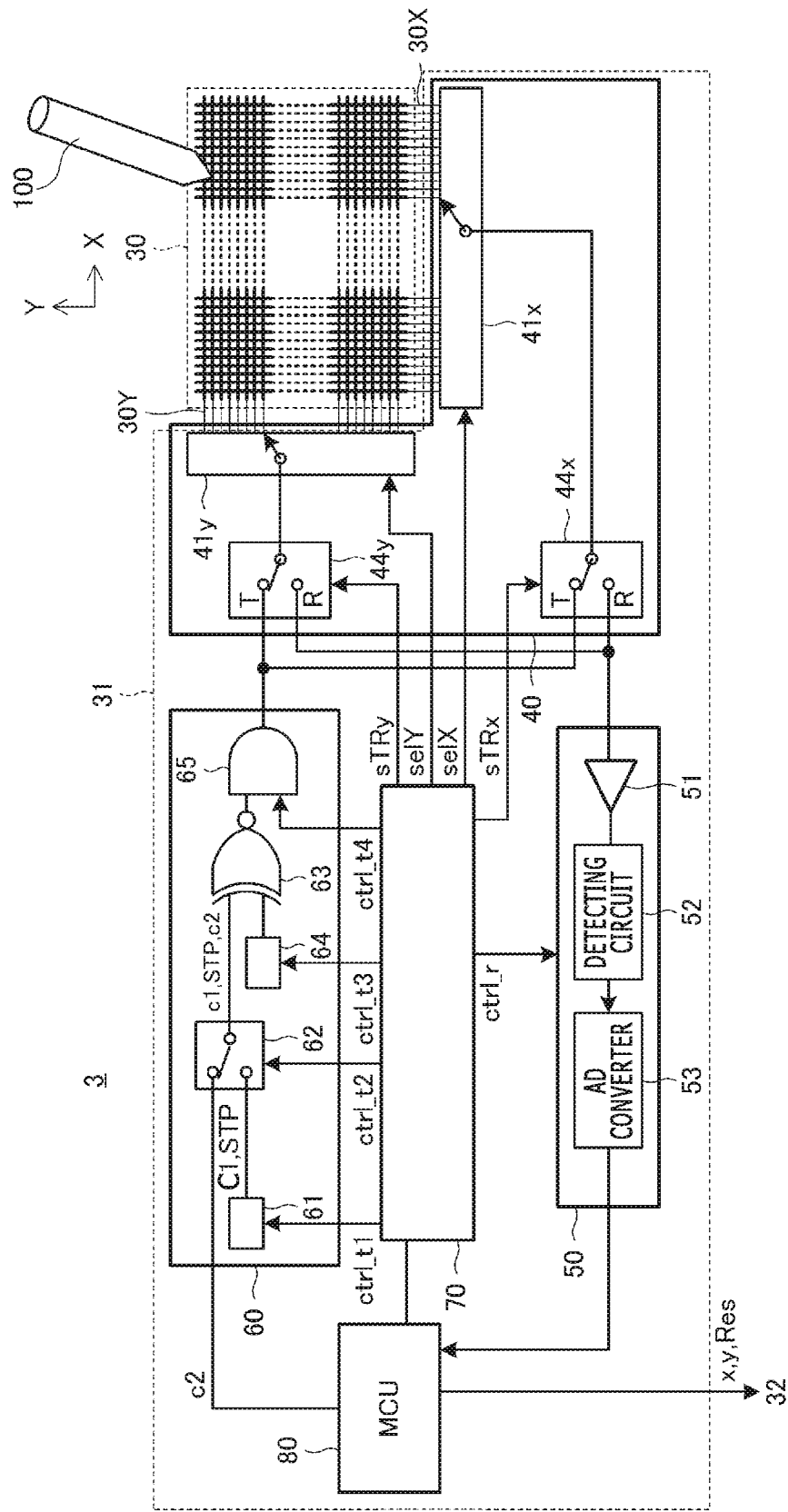
FIG. 4 is a diagram illustrating configurations of a sensor and a sensor controller depicted in FIG. 1.

FIG. 4 is a diagram illustrating a configuration of the electronic apparatus 3. As illustrated in the same figure, the sensor 30 is configured so that a plurality of linear electrodes 30X and a plurality of linear electrodes 30Y are arranged in a matrix fashion, and the sensor 30 is capacitively coupled with the stylus 100 by these linear electrodes 30X and 30Y. Also, the sensor controller 31 is configured to include a transmitting circuit 60, a selecting circuit 40, a receiving circuit 50, a logic circuit 70, and a micro controller unit (MCU) 80.

The transmitting circuit 60 is a circuit for sending the beacon signal BS depicted in FIG. 1. Specifically, the transmitting circuit 60 is configured to include a first control signal supply circuit 61, a switch 62, a direct spreading circuit 63, a spreading code holding circuit 64, and a transmitting guard circuit 65.

The first control signal supply circuit 61 retains a detection bit pattern c1 and has a function to continuously and repeatedly output the detection bit pattern c1 during a given continuous transmission period (e.g., 3 milliseconds) and to output an end bit pattern STP in accordance with the instruction of a control signal ctrl_t1 supplied from the logic circuit 70.

The detection bit pattern c1 is a bit pattern used by the stylus 100 to detect the presence of the sensor controller 31 and is configured to include a bit value that is known to the stylus 100 in advance (before the stylus 100 detects the sensor controller 31). Specifically, the detection bit pattern c1 may be configured as a 1-bit value which is either "0" or "1." Alternatively, the detection bit pattern c1 may be configured as a multi-bit value.

Also, the end bit pattern STP is a bit pattern for notifying the stylus 100 of the end of the continuous transmission period and is made up of a bit pattern that does not appear in the repeated detection bit pattern c1.

The switch 62 has a function to select one of the first control signal supply circuit 61 and the MCU 80 based on a control signal ctrl_t2 supplied from the logic circuit 70 and supply the selected one of the outputs to the direct spreading circuit 63. If the switch 62 selects the first control signal supply circuit 61, the direct spreading circuit 63 is supplied with the above detection bit pattern c1. On the other hand, if the switch 62 selects the MCU 80, the direct spreading circuit 63 is supplied with control information c2.

The control information c2 is information that includes a command indicating details of an instruction issued to the stylus 100 and is generated by the MCU 80. The control information c2 is information that forms a command for requesting the capability information CP from the stylus 100 or a command for setting a transmission method of the data D, and so on. The control information c2 includes a plurality of bits (arbitrary bit string) whose value is not shared with the stylus 100 in advance.

The spreading code holding circuit 64 has a function to generate a spreading code based on a control signal ctrl_t3 supplied from the logic circuit 70. The spreading code generated by the spreading code holding circuit 64 is supplied to the direct spreading circuit 63.

The direct spreading circuit 63 generates the beacon signal BS by multiplying (XORing) each of the bit values of a signal supplied from the switch 62 (detection bit pattern c1, end bit pattern STP, and control information c2, in various embodiments) by a spreading code supplied from the spreading code holding circuit 64. The beacon signal BS generated in this manner is a signal that includes the detection bit pattern c1, the end bit pattern STP, and the control information c2 in this order.

The transmitting guard circuit 65 is a functional circuit that inserts a guard period, which is a period during which neither transmission nor reception is conducted to switch between transmission and reception operations, at the end of a transmission period of the beacon signal BS (time slot s0 depicted in FIG. 2) based on a control signal ctrl_t4 supplied from the logic circuit 70. In FIG. 2, the blank portion between the end of the beacon signal BS and the end of the time slot s0 is this guard period.

The selecting circuit 40 is a switch that switches between the transmission period during which signals are sent from the sensor 30 and the reception period during which signals are received by the sensor 30 based on control performed by the logic circuit 70. Describing specifically, the selecting circuit 40 is configured to include a switch 44x and a switch 44y and a conductor selection circuit 41x and a conductor selection circuit 41y. The switch 44x operates, based on a control signal sTRx supplied from the logic circuit 70, in such a manner as to connect the output end of the transmitting circuit 60 to the input end of the conductor selection circuit 41x during the transmission period and connect the output end of the conductor selection circuit 41x to the input end of the receiving circuit 50 during the reception period. The switch 44y operates, based on a control signal sTRy supplied from the logic circuit 70, in such a manner as to connect the output end of the transmitting circuit 60 to the input end of the conductor selection circuit 41y during the transmission period and connect the output end of the conductor selection circuit 41y to the input end of the receiving circuit 50 during the reception period. The conductor selection circuit 41x operates, based on a control signal selX supplied from the logic circuit 70, in such a manner as to select one of the plurality of linear electrodes 201X and connect the selected electrode to the switch 44x. The conductor selection circuit 41y operates, based on a control signal selY supplied from the logic circuit 70, in such a manner as to select one of the plurality of linear electrodes 201Y and connect the selected electrode to the switch 44y.

The receiving circuit 50 is a circuit that receives the downlink signal DS sent by the stylus 100 based on a control signal ctrl_r of the logic circuit 70. Specifically, the receiving circuit 50 is configured to include an amplifying circuit 51, a detecting circuit 52, and an analog-digital (AD) converter 53.

The amplifying circuit 51 amplifies the downlink signal DS supplied from the selecting circuit 40 and outputs the amplified signal. The detecting circuit 52 is a circuit that generates a voltage proportional to the level of the output signal of the amplifying circuit 51. The AD converter 53 is a circuit that generates digital data by sampling the voltage output from the detecting circuit 52 at given time intervals. Digital data output from the AD converter 50 is supplied to the MCU 80.

The MCU 80 is a microprocessor that incorporates a read only memory (ROM) and a random access memory (RAM) and operates based on a given program. The logic circuit 70 outputs various control signals described above based on control performed by the MCU 80. The MCU 80 also takes charge of deriving coordinate data (X,Y) indicating the position of the stylus 100 and other data based on digital data supplied from the AD converter 53 and outputting such data to the system controller 32.

In various implementations, several drawing and signature verification algorithms that may run on the system controller 32 are implemented based on the premise that the data D such as position information (X,Y) and the pen pressure value TiP supplied from the sensor controller 31 is obtained at regular intervals on the time axis. Therefore, if there is a case in which the interactive data DF cannot be sent (i.e., the data D stutters) in a time slot, where the interactive data DF should be sent under normal circumstances, because of occasional transmission of the noninteractive data DINF, it is likely that the above drawing and signature verification algorithms may not work properly. For this reason, the time slot used for transmission of the noninteractive data DINF should be selected not to interfere with communication of the interactive data DF at regular intervals. Details of such configuration will be described later with reference to FIG. 15 and FIG. 16.

Also, there is a possibility that the capability information CP may change while the stylus 100 is located outside the sensing range SR of the sensor controller 31 as described earlier. For an inking process (process for adding information such as color information and line width to the coordinate data sequence) to be performed in the system controller 32, which is the host of the sensor controller 31, it is necessary that the sensor controller 31 has the capability information CP (e.g., the color Col and the style Styl that specifies the line width and brush type depicted in FIG. 5 in particular). For this reason, the capability information CP always becomes known to the sensor controller 31 anew each time the stylus 100 enters the sensing range SR. Specifically, the capability information CP is sent to the sensor controller 31 as a response signal to the beacon signal BS before the data D (interactive data DF) is sent from the stylus 100 to the sensor controller 31. Details of such configuration will be described later with reference to FIG. 13 and FIG. 14.

FIG. 5 is a diagram illustrating a configuration of the capability information CP. As depicted in the same figure, the capability information CP is a set of a plurality of pieces of individual capability information that are assigned different "Information Names." Each piece of individual capability information is contained in the capability information CP with the bit length indicated in "Transmission Size" when the capability information CP is sent. Also, some pieces of individual capability information are essential (Y) and must be contained in the capability information CP while others are not essential (N) in various embodiments. An example of the distinction between (Y) and (N) is illustrated to indicate typical examples of the number of bits required to form the capability information CP.

Pieces of individual capability information constituting the capability information CP may specifically include a vendor identifier VID, a serial number SN, the color Col, the style Styl, a state of the tail switch 103, a version Ver, and a data format DFmt as depicted in FIG. 5.

The vendor identifier VID is 8-bit information indicating the vendor of the stylus 100. The serial number SN is 56-bit information unique to each vendor assigned by each vendor. Adding the vendor identifier VID to the serial number SN generates a 64-bit unique user identifier UID (unique ID of the stylus 100).

The color Col is information representing 140 colors with 8 bits, which can be used in cascading style sheets (CSS), and is changed by operation of the tail switch 103.

The style Styl is 3-bit information that specifies the effect of the inking process by identifying, for example, whether the pen tip of the stylus 100 is a brush or a ballpoint pen.

The state of the tail switch 103 is information indicating the ON/OFF operating state of the tail switch 103. Although it is a piece of individual capability information among the capability information CP, this information is reflected in changes made to other individual capability information. As a result, it is not necessary to notify the information itself to the sensor controller 31. Therefore, the transmission size of the state of the tail switch 103 is set as "not applicable (N/A)."

The version Ver is 4-bit information indicating the version of the communication protocol used by the stylus 100.

The data format DFmt is typically 10- to 44-bit information that identifies the format of data signals used to send the data D (e.g., interactive data DF). Details of the data format DFmt will be described later with reference to FIG. 6.

As described above, the capability information CP includes various pieces of individual capability information, and of these, essential pieces of information (Y) that must be contained in the capability information CP (user identifier UID and data format DFmt) alone have a large transmission size in excess of 70 bits, for example. Therefore, when the number of bits that can be sent in one time slot is 16 bits as described above, it may not be possible to complete the transmission of the entire capability information CP within one time slot.

FIG. 6 is a diagram illustrating details of the data format DFmt depicted in FIG. 5. As illustrated in the same figure, the data format DFmt is a set of a plurality of individual formats that are assigned different "Names." Each individual format is contained in the data format DFmt with the bit length indicated in "Transmission Size" when the capability information CP is determined and sent.

Individual formats making up the data format DFmt specifically include a number of pen pressure reading levels PL, a number of barrel buttons BBN, a tangential pen pressure flag TaPf, the orientation code ORC, a custom data flag CDf, an orientation resolution ORR, a custom pen pressure size CPS, a custom button size CBS, a custom orientation size COS, and a custom data size CDS. The meaning of each is given in the "Definition" column in FIG. 6. These details indicate the types of one or more individual pieces of interactive data (described later) that can be obtained by the stylus 100 and their transmission sizes. They are determined based on the one or more pieces of interactive data that can be obtained by the stylus 100, in steps S1 and S3 of FIG. 11 which will be described later. Each will be described in detail below.

The number of pen pressure reading levels PL is 3-bit information indicating the number of levels (resolution) of the pen pressure value TiP (refer to FIG. 9), which is one of the interactive data DF. When the value PL is any one of 0 to 6, this indicates that the number of levels is $256 \times 2^{PL}$. In the case of PL=0, which is considered identical to PL=−8, the number of pen pressure levels is $256 \times 2^0 = 256$. When PL=7, the number of pen pressure levels is uniquely specified as a custom pen pressure size CPS.

The number of barrel buttons BBN is 2-bit information indicating the number of barrel buttons 104 (refer to FIG. 3) available with the stylus 100. When the value BBN is any one of 0 to 2, the number indicates the number of barrel button(s) 104 included in the stylus 100. If the stylus 100 has operating elements other than the barrel buttons 104, the number thereof may also be added to the number of barrel buttons BBN. When BBN=3, it indicates a custom number (custom button size) CBS of operating elements including the barrel buttons 104. The number of barrel buttons BBN may be bits that respectively represent the presence or absence of the first barrel button to the BBNth barrel button. For example, if there are two bits, each of these bits may indicate whether the first barrel button is provided or whether the second barrel button is provided.

The tangential pen pressure flag TaPf is 1-bit information indicating whether or not the stylus 100 is capable of obtaining a tangential pen pressure value (pressure applied in the direction tangential to the touch surface 3a), and indicates that when the flag is 0, the stylus 100 is not capable, and that when the flag is 1, the stylus 100 is capable. The same number of levels as the number of pen pressure reading levels PL is used as the number of levels when the stylus 100 is capable of obtaining a tangential pen pressure.

The orientation code ORC is 3-bit information that specifies the format of the orientation OR (refer to FIG. 9), which is one of the interactive data DF. Although the orientation code ORC will be described in detail later with reference to FIG. 7, when ORC=7, only the data size of the orientation OR is specified as a custom orientation size COS.

The custom data flag CDf is 1-bit information that indicates whether or not the stylus 100 acquires custom data CD (vendor's unique data not standardized as one of the interactive data DF; refer to FIG. 9) and indicates that when the flag is 0, the custom data CD does not exist, and that when the flag is 1, the custom data CD exists.

The orientation resolution ORR is 0- to 2-bit information that indicates the resolution of the orientation OR (refer to FIG. 9) and is contained in the data format DFmt when the value of the orientation code ORC is greater than 0, that is, only when the stylus 100 is capable of obtaining the orientation OR. The resolution of the orientation OR indicated by the orientation resolution ORR is (8+ORR) bits.

The custom pen pressure size CPS is 8-bit information indicating a custom value of pen pressure levels and is contained in the data format DFmt only when the number of pen pressure reading levels PL is 7. Because the custom pen pressure size CPS is 8 bits, the maximum number of pen pressure levels that can be represented by the custom pen pressure size CPS is 256.

The custom button size CBS is 8-bit information indicating the number of operating elements including the barrel buttons 104 and is contained in the data format DFmt only when the number of barrel buttons BBN is 3. Because the custom button size CBS is 8 bits, the maximum number of operating elements that can be represented by the custom button size CBS is 256.

The custom orientation size COS is 8-bit information that indicates the number of bytes of the orientation OR and is contained in the data format DFmt only when the orientation code ORC is 7. Because the custom orientation size COS is 8 bits, the maximum number of bytes of the orientation OR that can be represented by the custom orientation size COS is 256 bytes. It should be noted, however, that the actual maximum size of the orientation OR is 72 bits, as will be described later with reference to FIG. 9.

The custom data size CDS is 8-bit information that indicates the number of bytes of the custom data CD and is contained in the data format DFmt only when the custom data flag CDf is 1. Because the custom data size CDS is 8 bits, the maximum number of bytes of the custom data CD that can be represented by the custom data size CDS is 256 bytes. As will be described later with reference to FIG. 9, the actual maximum size of the custom data CD is 256 bits.

As has been described up to this point, in the system 1, each of the data sizes of the custom values indicated respectively by the custom pen pressure size CPS, the custom button size CBS, the custom orientation size COS, and the custom data size CDS is 8 bits when the size is contained in the data format DFmt and 0 bit when the size is not contained in the data format DFmt. This is a configuration that eliminates the need for a bit that indicates the end position, while at the same time achieving the data format DFmt having a variable length, and facilitates simplification of the data format DFmt as a result.

FIG. 7 is a diagram illustrating a definition of the orientation code ORC (orientation code table OCT) depicted in FIG. 6. In the same figure, "ORC" at the left end indicates the value of the orientation code ORC, and "Data Size" at the right end indicates the data size of the orientation OR with a number of exclusively-used time slots (number of time slots required to send the orientation OR once).

That the value of the orientation code ORC is "0" indicates that the stylus 100 does not obtain the orientation OR (or does not have a function to obtain the orientation OR). As illustrated in FIG. 18 which will be described later, when the orientation OR is contained in the interactive data DF, it is necessary to have additional time slots available for sending the interactive data DF. However, when the value of the orientation code ORC is "0," such additional time slots are not necessary.

That the value of the orientation code ORC is "1" indicates that the stylus 100 can obtain the orientation OR indicating a two-dimensional (2D) inclination with two directional values (X tilt, Y tilt) and that two time slots are required to send that orientation OR once. Although, in the example of the figure, two consecutive time slots are allocated, the two time slots may be consecutive or not consecutive.

That the value of the orientation code ORC is "2" indicates that the stylus 100 can obtain the orientation OR indicating a three-dimensional (3D) value made up of a two-dimensional (2D) inclination with two directional values (X tilt, Y tilt) and a twist, which is an amount of rotation around a pen axis, and that three consecutive or inconsecutive time slots are required to send that orientation OR once.

That the value of the orientation code ORC is "3" indicates that the stylus 100 can obtain the orientation OR indicating a two-dimensional (2D) inclination with two directional values (altitude, azimuth) and that two time slots are required to send that orientation OR once.

That the value of the orientation code ORC is "4" indicates that the stylus 100 can obtain the orientation OR indicating a three-dimensional (3D) value made up of a two-dimensional (2D) inclination with two directional values (altitude, azimuth) and a twist, which is an amount of rotation around the pen axis, and that three time slots are required to send that orientation OR once.

That the value of the orientation code ORC is "5" indicates that the stylus 100 can obtain the orientation OR, which is a measured value of a 6-axis IMU including accelerometer and gyro, and that three time slots are required to send that orientation OR once.

That the value of the orientation code ORC is "6" indicates that the stylus 100 can obtain the orientation OR, which is a measured value of a 9-axis IMU, and that three time slots or more are required to send that orientation OR once.

That the value of the orientation code ORC is "7" indicates, as described earlier, that the number of bytes of the orientation OR is represented by the custom orientation size COS illustrated in FIG. 6.

As described above, the use of the orientation code ORC makes it possible to notify, to the sensor controller 31, the presence or absence of orientation detection functions of the stylus 100 or the type of the orientation OR that can serve as various information in accordance with the type of the IMU, using 3-bit short information. It is also possible to notify, to the sensor controller 31, the number of time slots required in relation to the use of the different number of consecutive or inconsecutive time slots in accordance with the type of the orientation OR.

FIG. 8 depicts diagrams illustrating description examples of the data format DFmt depicted in FIG. 5. Description example 1 illustrated in FIG. 8(*a*) and description example 2 illustrated in FIG. 8(*b*) depict cases in which the data format DFmt is represented by 9 bits, with no custom value included (i.e., exclusive of the "NO CUSTOM DATA" flag bit 1). In description example 1, the value of the orientation code ORC is 0 (0b000), that is, the stylus 100 does not obtain the orientation OR. Therefore, it is not necessary to have additional time slots for the orientation OR. In description example 2, on the other hand, the value of the orientation code ORC is 6 (0b110). Therefore, it is necessary to have three additional time slots or more for the orientation OR. Also, description example 3 illustrated in FIG. 8(*c*) depicts a case in which the number of pen pressure reading levels PL is customized and represented by the custom pen pressure size CPS. In this case, the 8-bit custom pen pressure size CPS is described at the end of the data format DFmt. As a result, the number of bits of the data format DFmt is 17.

As described above, the data format DFmt included in the capability information CP according to the present embodiment is represented by a bit string of 10 bits to 44 bits. Because the data format DFmt is notified from the stylus 100 to the sensor controller 31, the sensor controller 31 becomes aware of the elements of the interactive data DF, the size, and the presence or absence of optional data before it receives the interactive data DF. Thereafter the interactive data DF is sent from the stylus 100.

FIG. 9 is a diagram illustrating a configuration of the interactive data DF. As illustrated in the same figure, the interactive data DF is a set of a plurality of pieces of individual interactive data that are assigned different "Names." Each piece of individual interactive data is contained in the interactive data DF with the bit length indicated in "Transmission Size" when the interactive data DF is sent. Also, some pieces of individual interactive data are essential (Y) and must be contained in the interactive data DF while others are not essential (N). In the figure, an example of the distinction between (Y) and (N) is illustrated to count the total number of bits typically required to form the interactive data DF. The order of transmission of individual interactive data is also depicted in the same figure, and the stylus 100 is configured to send the individual interactive data in the order from the top to the bottom in the figure.

Individual interactive data forming the interactive data DF specifically includes the pen pressure value TiP, a tangential pen pressure value TaP, the barrel button state BB, an inversion Inv, the orientation OR, and the custom data CD.

The pen pressure value TiP is 8- to 256-bit information that indicates the pen pressure value applied to the tip of the stylus 100 and is detected by the operation state detection circuitry 105 depicted in FIG. 3. The pen pressure value TiP is always contained in the interactive data DF (Y). The number of bits of the pen pressure value TiP is derived from the number of pen pressure reading levels PL or the custom pen pressure size CPS in the data format DFmt illustrated in FIG. 6. For example, when the number of pen pressure reading levels PL is 0 (or −8), the number of pen pressure levels is 256. As a result, the number of bits of the pen pressure value TiP is $\log_2 256 = 8$. In a typical example, the number of bits of the pen pressure value TiP is 8 (256 levels) to 11 (2048 levels).

The tangential pen pressure value TaP is 0- to 256-bit information that indicates the tangential pen pressure value and is detected by the operation state detection circuitry 105 depicted in FIG. 3. The tangential pen pressure value TaP is optional data and is contained in the interactive data DF only when the tangential pen pressure flag TaPf depicted in FIG. 6 is 1 (N). The number of bits of the tangential pen pressure value TaP when the tangential pen pressure value TaP is contained in the interactive data DF is the same as that for the pen pressure value TiP. In a typical example, the tangential pen pressure value TaP is 0-bit information and is not contained in the interactive data DF.

The barrel button state BB is 2- to 256-bit information that indicates the pressed state of the barrel button 104 depicted in FIG. 3. The barrel button state BB is always contained in the interactive data DF (Y) in the illustrated embodiment. The number of bits of the barrel button state BB is a value equal to the number of barrel buttons 104 indicated by the number of barrel buttons BBN, or the custom button size CBS in the data format DFmt illustrated in FIG. 6. For example, when the number of barrel buttons BBN is 1, the number of barrel buttons 104 included in the stylus 100 is 2. As a result, the number of bits of the barrel button state BB is 2. In a typical example, the number of bits of the barrel button state BB is 2.

The inversion Inv is 1-bit information and contained in the interactive data DF (Y).

The orientation OR is 0- to 72-bit data that indicates the orientation of the stylus 100 and is detected by the operation state detection circuitry 105 depicted in FIG. 3. The orientation OR is optional data and contained in the interactive data DF only when the orientation code ORC depicted in FIG. 6 is not 0 (refer to FIG. 7) (N). The specific meaning of the orientation OR is represented by the orientation code ORC as described with reference to FIG. 7. On the other hand, the size of the orientation OR is indicated by the data size illustrated in FIG. 7 (including the case in which the size is specified by the custom orientation size COS). For example, the orientation OR representing a two-dimensional or three-dimensional value is sent consecutively in the example shown in the figure by using two time slots or three time slots in accordance with the specification in the orientation code table OCT shown in FIG. 7 (refer to FIG. 18).

The custom data CD is 0- to 256-bit information uniquely specified by the vendor of the stylus 100. The custom data CD is optional data and contained in the interactive data DF only when the custom data flag CDf depicted in FIG. 6 is 1 (N). The number of bits of the custom data CD is represented by the custom data size CDS depicted in FIG. 6. For example, when the custom data size CDS is 1, the number of bytes of the custom data CD is 1. As a result, the number of bits of the custom data CD is 8.

The number of bits of the interactive data DF is, in an example of a minimum number, 11 bits which is the total of the 8-bit pen pressure value TiP, the 2-bit barrel button state BB, and the 1-bit inversion Inv (15 bits when a 4-bit error detection code is added). Also, in a typical example, the number of bits which is the total of the 11-bit pen pressure value TiP, the 2-bit barrel button state BB, and the 1-bit inversion Inv amounts to 14 bits (18 bits when a 4-bit error detection code is added). As described above, it is possible to send 16 bits worth of data per time slot. Therefore, the transmission of the interactive data DF not including the orientation OR nor the custom data CD can be completed in one time slot (refer to FIG. 15 and FIG. 16). On the other hand, the transmission of the interactive data DF including the orientation OR or the custom data CD normally exceeds 16 bits and, therefore, cannot be completed in one time slot, resulting in use of a plurality of time slots (refer to FIG. 17 and FIG. 18).

FIG. 10 is a diagram illustrating a configuration of the noninteractive data DINF. As illustrated in the same figure, the noninteractive data DINF is a set of a plurality of pieces of individual noninteractive data that are assigned different "Names." Each piece of individual noninteractive data is contained in the noninteractive data DINF with the bit length indicated in "Transmission Size" when the noninteractive data DINF is sent.

Only the battery level BL is depicted in FIG. 10 as an example of individual noninteractive data forming the noninteractive data DINF. The battery level BL is 4-bit information indicating the remaining capacity level of the battery 101 depicted in FIG. 3. It is a matter of course that other kinds of individual noninteractive data may be included in the noninteractive data DINF.

The noninteractive data DINF is sent once every plurality of frames F (e.g., every several hundred frames) as described above (refer to FIG. 15 to FIG. 18).

A detailed description will be given of the operation of the stylus 100 and the sensor controller 31 with reference to FIG. 11 to FIG. 18.

Figure 11:
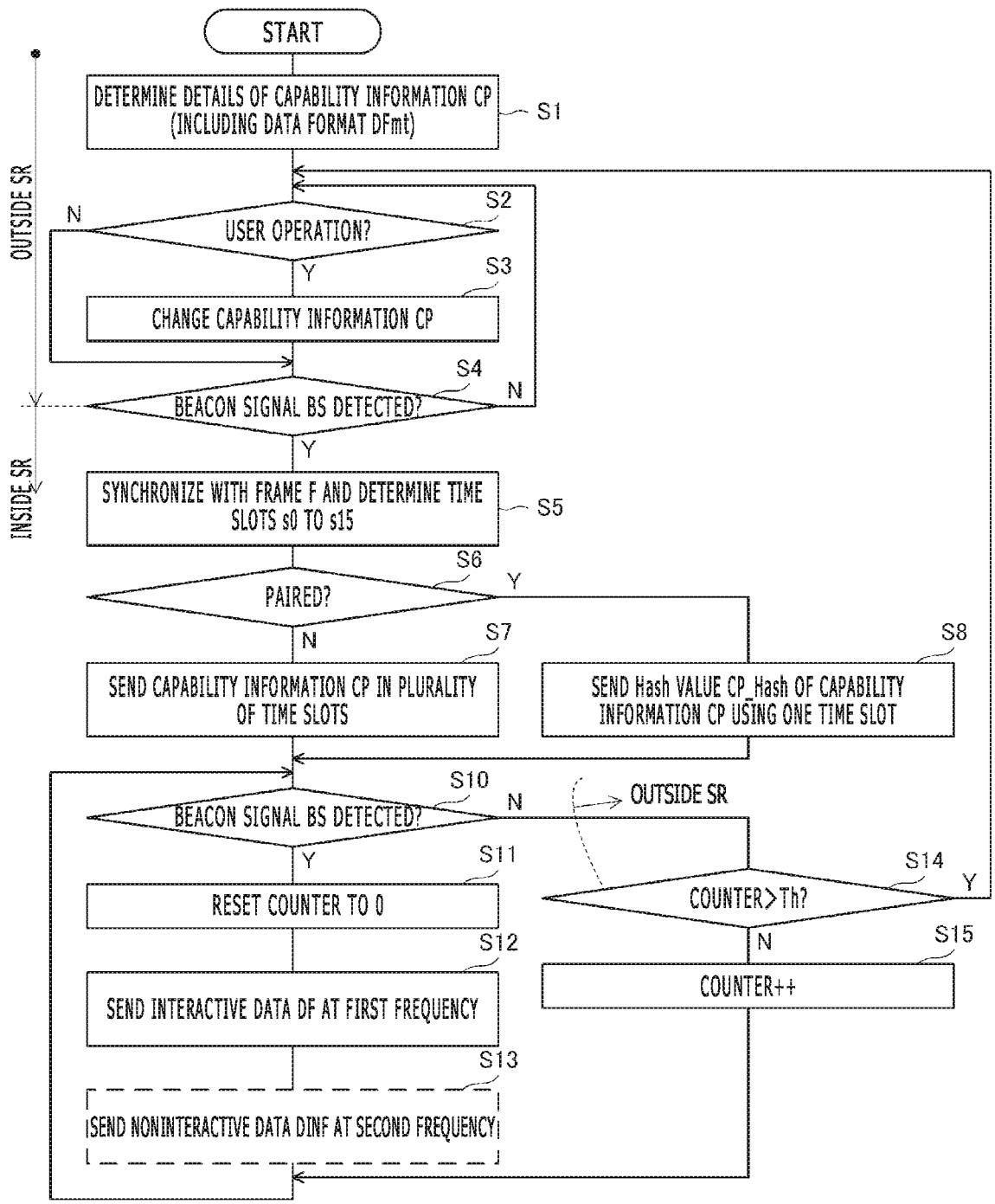
FIG. 11 is a diagram illustrating a flow of operation of the stylus depicted in FIG. 1.

First, FIG. 11 is a diagram illustrating a flow of operation of the stylus 100. The stylus 100 proceeds with the operation, to be described in section "A1" below, while it is located outside the sensing range SR after power is turned on.

<A1. Updating Process of the Capability Information CP (Operation Outside the Sensing Range SR)>

The stylus 100 determines the capability information CP including the data format DFmt after power is turned on (step S1). At this time, the stylus 100 determines details of the data format DFmt based on the one or more pieces of the interactive data DF that can be obtained by the stylus 100 itself. That is, when, for example, the stylus 100 is capable of obtaining a tangential pen pressure as described above, the tangential pen pressure flag TaPf in the data format DFmt is 1, and when the stylus 100 is not capable of obtaining a tangential pen pressure, the tangential pen pressure flag TaPf in the data format DFmt is 0. Thereafter, the stylus 100 determines whether the user has performed any operation to change the capability information CP (specifically, operation of the tail switch 103) (step S2). Then, when an operation has been performed to change the capability information CP, the capability information CP determined in step S1 is changed to correspond with the nature of the operation (step S3).

After the processes in step S2 and step S3, the stylus 100 determines whether the beacon signal BS has been detected (step S4). When determining in this step S4 that the beacon signal BS has not been detected (i.e., the stylus 100 is located outside the sensing range SR of the sensor controller 31), the stylus 100 will return to step S2 to repeat the processes up to this point. On the other hand, when determining in step S4 that the beacon signal BS has been detected, the stylus 100 will proceed with the operation described in section "A2" below.

<A2. Operation after the Stylus 100 Enters the Sensing Range SR>

After entering the sensing range SR of the sensor controller 31 as a result of the lowering operation of the user (affirmative determination in step S4), the stylus 100 synchronizes with the frame F specified by the sensor controller 31 with reference to the detected beacon signal BS and identifies (determines) the time slots s0 to s15 thereof (step S5).

<A2-1. Communication of the Capability Information CP>

Next, the stylus 100 performs a process of rendering the capability information CP known to the sensor controller 31 (sharing the capability information CP with the sensor controller 31) (step S6 to step S8). Here, in the system 1, the number of bits that can be sent in one time slot is limited, for example, to 16 bits as described above. On the other hand, the capability information CP is information that exceeds 70 bits as described above. Therefore, all the capability information CP cannot be sent in one time slot. As a result, it is necessary to send the capability information CP in batches over a plurality of time slots if all the information is sent. However, if such transmission in batches is conducted not just once, but twice and three times, there is a likelihood that the transmission of the capability information CP may not be completed by the time the stylus 100 comes in contact with the touch surface 3a (refer to FIG. 1) and that, as a result, an unpleasant condition for the user may occur, which is that, despite the fact that the stylus 100 is in contact with the touch surface 3a, a line is not always drawn from when the stylus 100 comes in contact. In the present embodiment, therefore, information equivalent to the capability information CP (specifically, hash value of the capability information CP) rather than the capability information CP itself is sent to the sensor controller 31, to which all the capability information CP has already been sent once. A specific description will be given below.

The stylus 100 determines first whether the stylus 100 has already been paired with the sensor controller 31 that sends out the beacon signal BS (step S6). This determination can be made, for example, by determining the register value in the stylus 100. It should be noted that, in various embodiments, the beacon signal BS does not include any information that identifies the sensor controller 31. Therefore, the determination here is about whether the stylus 100 has been paired with (any) one of the sensor controllers 31 and is not about whether the stylus 100 has been paired with the specific sensor controller 31.

When determining that the stylus 100 has yet to be paired with the sensor controller 31 as a result of the determination in step S6 (negative determination in step S6), the stylus 100 will repeatedly send the capability information CP (information exceeding 70 bits depicted in FIG. 5; including the data format DFmt and the user identifier UID made up of the serial number SN and the vendor identifier VID) in a plurality of time slots (step S7).

Figure 13:
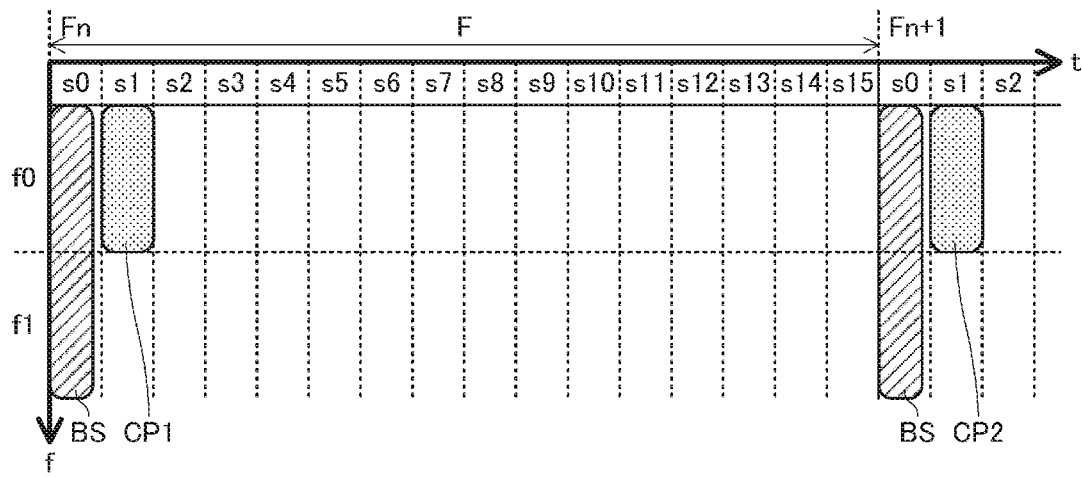
FIG. 13 is a diagram illustrating an example of allocation of time slots to the capability information CP.

FIG. 13 is a diagram illustrating an example of allocation of time slots to the capability information CP. The stylus 100 in the example depicted in the same figure divides the capability information CP into a plurality of pieces of partial capability information CP1, CP2 and so on and sends them in the time slots s1 of frames Fn, Fn+1 and so on, respectively. Such transmission of the capability information CP requires a plurality of time slots worth of time (a plurality of frames worth of time in this example). This is a process that is required at least once at first. It should be noted that the capability information CP needs to be sent using the time slot s1 as also depicted in FIG. 13. The reason for this is to ensure transmission of the capability information CP or shortened information (hash value CP_Hash) at a time when a response signal to the beacon signal BS including a command should be sent. This way, the sensor controller 31 can recognize the presence or absence of a response signal (the presence or absence of the stylus 100) to the beacon signal BS by monitoring the signal received in the time slot s1 following the transmission of the beacon signal BS, and time slots s2 and thereafter following the time slot s1 can be reserved for reception of the data D.

On the other hand, when determining that the stylus 100 has already been paired with the sensor controller 31 as a result of the determination in step S6 (affirmative determination in step S6), the stylus 100 will send minimum information for identifying the capability information CP, which is a piece of information of a size that can be sent in one time slot (shortened information) using one time slot s1 rather than sending all the capability information CP including the data format DFmt in step S7 (step S8). It is preferred that this information should, for example, be information that permits identification, with a given probability, of whether or not the associated capability information CP is authentic, such as the hash value CP_Hash of 20 bits or less (e.g., 16 bits) of the capability information CP. In the description given below, it is assumed that the hash value CP_Hash is used as shortened information. When sending the hash value CP_Hash in step S8, the stylus 100 will perform a process of deriving the hash value CP_Hash from the capability information CP prior to the transmission.

Figure 14:
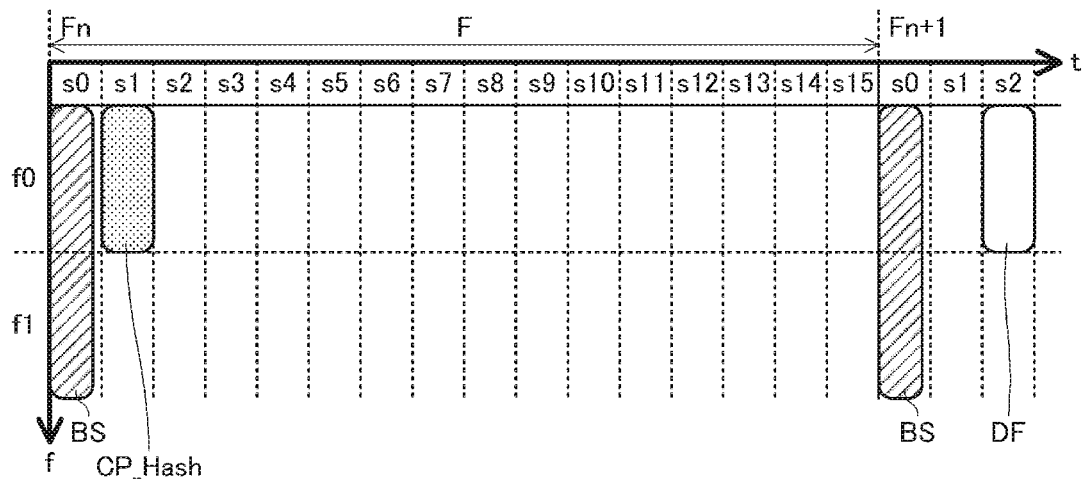
FIG. 14 is a diagram illustrating an example of allocation of time slots to a hash value CP_Hash of the capability information CP.

FIG. 14 is a diagram illustrating an example of allocation of time slot(s) to the hash value CP_Hash of the capability information CP. As illustrated in the same figure, the transmission of the hash value CP_Hash is completed only in the time slot s1 of the frame Fn. As a result, the interactive data DF can be sent in the time slot s1 from the next frame Fn+1.

Thus, in the system 1 according to the present embodiment, after the capability information CP becomes known to the sensor controller 31 once (after the stylus 100 is paired with the sensor controller 31), each time the stylus 100 enters the sensing range SR, the stylus 100 can notify the sensor controller 31 of the capability information CP (including the data format DFmt) by sending shortened information (specifically, the hash value CP_Hash) in place of sending the capability information CP that has already been sent once. It is possible for the sensor controller 31 to identify the capability information CP of the approaching stylus 100 with a probability that does not substantially cause any practical problem by simply receiving shortened information in one time slot.

It should be noted that although, in the present embodiment, a description has been given assuming that the sensor controller 31 unconditionally accepts the capability information CP sent by the stylus 100, the sensor controller 31 may determine that part or whole of information specified in the capability information CP is not accepted in accordance with its own resources and notify details of the determination to the stylus 100. In this case, the stylus 100 does not send information that is not accepted by the sensor controller 31. Details in this regard will be described later with reference to FIG. 19.

<A2-2. Communication of the Data D>

After the transmission of the capability information CP or the hash value CP_Hash is completed, the stylus 100 sends a data signal including the data D (step S10 to step S15). Specifically, the stylus 100 detects the beacon signal B S (step S10).

After detecting the beacon signal BS in step S10 (affirmative determination in step S10), the stylus 100 resets a consecutive non-detection counter to 0 (step S11). Then, the stylus 100 sends a data signal including the interactive data DF in the format (typically 11 to 14 bits) specified in the data format DFmt of the capability information CP at least once per frame F.

It should be noted that although, in the present embodiment, a description will be given assuming that the stylus 100 decides on the time slot to be used for transmission of the data D, the sensor controller 31 may decide on the time slot to be used for transmission of the data D and notify the details of the decision to the stylus 100. Details in this regard will be described later with reference to FIG. 19.

FIG. 15 is a diagram illustrating an example of allocation of time slots to the interactive data DF and the noninteractive data DINF. In the example depicted in the same figure, the 14-bit interactive data DF, which is a piece of interactive data having a typical size, is sent using four time slots s2, s6, s10, and s14 per frame F (data signals DF1, DF2, DF3, and DF4). In these four time slots s2, s6, s10, and s14, the interactive data DF is sent one piece at a time. According to the allocation of time slots according to this example, as illustrated in FIG. 15, not only within each individual frame F but also across multiple frames F, the interval between the time slots used for transmission of the interactive data DF is maintained (the interval between the data signal DF4 (time slot s14) sent last in the frame Fn+1 and a data signal DF5 (time slot s2) sent first in a next frame Fn+2 is three time slots which is the same as that within the individual frame F). This makes it possible to send the interactive data DF periodically at the fixed period T (=four time slots). Such a feature of the system 1 is preferred for an application of the system controller 32 that requires the acquisition of the interactive data DF at regular intervals.

It should be noted that the value having the period T of four time slots depicted in FIG. 15 is the shortest under the condition in which the time slots s0 and s1 (and a time slot s15 which will be described later) are reserved (i.e., under the condition in which the time slot s0 is reserved for transmission of the beacon signal BS, the time slot s1 is reserved for transmission of a response signal to the beacon signal BS, and the time slot s15 is reserved for transmission of the noninteractive data DINF). Setting the period T to be the shortest value allows for improvement of the number of transmissions of the interactive data DF. It is also possible for the sensor controller 31 to obtain more detailed coordinate data of the stylus 100.

FIG. 16 is a diagram illustrating another example of allocation of time slots to the interactive data DF and the noninteractive data DINF. In the example depicted in the same figure, the 14-bit interactive data DF, which is a piece of interactive data having a typical size, is sent using four time slots s3, s7, s11, and s15 per frame F (data signals DF1, DF2, DF3, and DF4). Such allocation of time slots also allows for periodic transmission of the interactive data DF at the shortest period T (=four time slots) as in the example depicted in FIG. 15.

Referring back to FIG. 11, the stylus 100 sends the noninteractive data DINF at a rate of once every plurality of frames F (once every several hundred frames F) (step S13). It should be noted that, as described above, the stylus 100 may send the noninteractive data DINF in response to polling (request to send) from the sensor controller 31. In this case, polling from the sensor controller 31 is contained in the beacon signal BS as a command.

Referring again to FIG. 15, the noninteractive data DINF is sent in the time slot s15 in this example. In the example depicted in FIG. 15, the time slot s15 is usually not used. However, such a time slot s15 is used to send the noninteractive data DINF once every plurality of frames F, making it possible to send the noninteractive data DINF without affecting the transmission period T of the interactive data DF.

In the example depicted in FIG. 16, on the other hand, the noninteractive data DINF is sent in the time slot s1. The time slot s1 is originally used to send a response signal (capability information CP and hash value CP_Hash) to the beacon signal BS as described above. However, the probability that the time slot s1 will be actually used to send a response signal is lower than the probability for other time slots. The occurrence of collision between a response signal and the noninteractive data DINF as a result of the transmission of the noninteractive data DINF in the time slot s1 is limited to the case in which the stylus 100 communicates the noninteractive data DINF once every plurality of frames F at the same time as another (new) stylus 100 happens to enter the sensing range SR and to send a response signal to the beacon signal BS. Therefore, there typically is no issue even if the stylus 100 sends the noninteractive data DINF in the time slot s1, and thus the time slots that are available in limited quantity can be efficiently used. In addition, the time slots s3, s7, s11, and s15 can be used for transmission of the other data D (interactive data DF) by not transmitting the noninteractive data DINF in the time slot s15 and releasing the time slot s15. In this case, the time slots s2, s6, s10, and s14 and the time slots s3, s7, s11, and s15 can be assigned to different styluses 100. This allows the plurality of styluses 100 to send the interactive data DF at the transmission periods T (i.e., through time division multiplexing).

FIG. 17 is a diagram illustrating an example of allocation of time slots to the interactive data DF and the noninteractive data DINF when the interactive data DF includes the custom data CD. FIG. 17 depicts a case in which the interactive data DF includes the 11-bit pen pressure value TiP, the 2-bit barrel button state BB, the 1-bit inversion Inv, and the 8-bit custom data CD. It should be noted that the values of the custom data flag CDf and the custom data size CDS depicted in FIG. 6 are both 1. The size of the interactive data DF in this case is 22 bits, which is a size larger than 16 bits that can be sent in one time slot. Therefore, the stylus 100 sends the interactive data DF using two consecutive time slots as illustrated in FIG. 17. Using such allocation of time slots permits transmission at the fixed period T even if the size of the interactive data DF is larger than the size that can be sent in one time slot.

FIG. 18 is a diagram illustrating an example of allocation of time slots and frequencies to the interactive data DF and the noninteractive data DINF when the interactive data DF includes the orientation OR. In the example depicted in the same figure, two frequencies f0 and f1 are used, and three time slots are used at the frequency f0, and four time slots are used at the frequency f1 to send the interactive data DF. Then, the orientation OR is sent using two time slots at the frequency f0 and three time slots at the frequency f1 or a total of five time slots. Such allocation of time slots and frequencies permits transmission at the fixed period T even if the size of the interactive data DF is large enough to be sent using seven time slots. It should be noted, however, that the interval T in this case is longer than the interval T in FIG. 15 to FIG. 17 as can be understood by comparing FIG. 18 against FIG. 15 to FIG. 17. It should be noted that if such frequency multiplexing cannot be used, the data may be sent using a total of seven time slots that are spread across the two or more frames F.

<A2-3. Operation of the Stylus 100 after Leaving the Sensing Range SR>

Referring back to FIG. 11, if the beacon signal BS is no longer detected in step S10 (negative determination in step S10), the stylus 100 determines whether or not the consecutive non-detection counter value is larger than a given threshold Th (step S14). When determining that the consecutive non-detection counter value is not larger, the stylus 100 will increment the consecutive non-detection counter value by 1 (step S15) and returns to step S10. On the other hand, when the stylus 100 determines that the consecutive non-detection counter value is larger in step S14, this means that the stylus 100 has moved out of the sensing range SR. Therefore, the stylus 100 is restored to step S2, that is, the state in which the stylus 100 accepts the operation of the tail switch 103 by the user.

Figure 12:
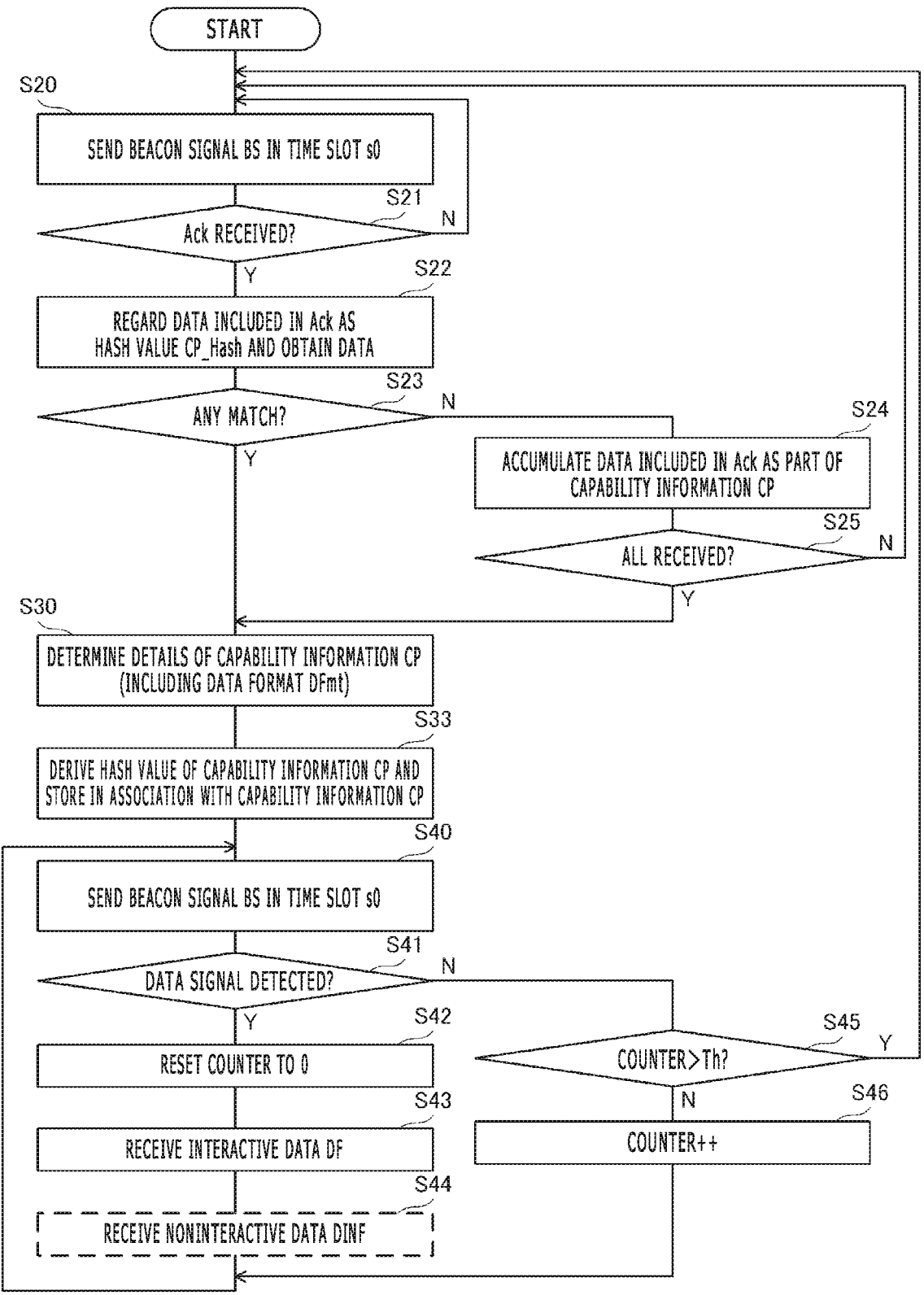
FIG. 12 is a diagram illustrating a flow of operation of the sensor controller depicted in FIG. 1.

Next, FIG. 12 is a diagram illustrating a flow of operation of the sensor controller 31. The sensor controller 31 initiates the operation described in section "B1" below after power is turned on.

<B1. Reception of the Capability Information CP>

The sensor controller 31 repeatedly sends the beacon signal BS in the time slot s0 (step S20) and each time goes on standby to wait for a response signal Ack from the stylus 100 in the time slot s1 (step S21).

When receiving the downlink signal DS which is the response signal Ack (i.e., downlink signal DS received in the time slot s1) (affirmative determination in step S21) in step S21, the sensor controller 31 will treat the data included in the received response signal Ack as the hash value CP_Hash of the capability information CP (step S22). Then, the sensor controller 31 determines whether or not the hash value CP_Hash matches any one of the hash values CP_Hash stored in the past in step S33 which will be described later (step S23). When determining that there is the matching hash value CP_Hash, the sensor controller 31 will determine details of the capability information CP (including the data format DFmt) of the currently approaching stylus 100 using the capability information CP stored in association with that hash value CP_Hash (step S30).

On the other hand, when determining in step S23 that there is no matching hash value CP_Hash, the sensor controller 31 will accumulate the data included in the response signal Ack as part of the capability information CP (step S24). Then, the sensor controller 31 determines whether or not all the capability information CP has been accumulated as a result of the repetition of the processes up to this point (step S25). When determining that all the capability information CP has been accumulated, the sensor controller 31 will determine details of the capability information CP (including the data format DFmt) of the currently approaching stylus 100 (step S30). On the other hand, when determining that all the capability information CP has yet to be accumulated, the sensor controller 31 will return to step S20 to repeat the transmission of the beacon signal BS.

The stylus 100 that determined the details of the capability information CP in step S30 derives the hash value thereof and stores the hash value in a storage area in association with the capability information CP as associated data (step S33). The storage area of the associated data created as described above (associated data storage area) can be implemented as a so-called hash table that retains values in relation to hash values as keys.

<B2. Reception of the Data D>

Next, the sensor controller 31 sends the beacon signal BS again in the time slot s0 (step S40). Then, the sensor controller 31 determines whether or not some kind of data signal has been detected in time slots other than the time slots s0 and s1 (step S41), and when determining that a data signal has been detected, the sensor controller 31 will reset a consecutive non-reception counter to 0 (step S42). Thereafter, the sensor controller 31 receives the interactive data DF by extracting the interactive data DF from the detected data signal (step S43). The sensor controller 31 also receives the noninteractive data DINF once every plurality of frames F by extracting the noninteractive data DINF from the detected data signal (step S44).

On the other hand, when determining in step S41 that the data signal has yet to be detected, the sensor controller 31 will determine whether or not the consecutive non-reception counter value is larger than the given threshold Th (step S45). When determining that the consecutive non-reception counter value is not larger, the sensor controller 31 will increment the consecutive non-reception counter value by 1 (step S46) and return to step S40. Meanwhile, when determining in step S45 that the consecutive non-reception counter value is larger, this means that the stylus 100 has moved out of the sensing range SR. Therefore, the sensor controller 31 returns to step 20 to continue with the processes.

As described above, according to the method using the stylus 100 and the sensor controller 31, the sensor controller 31, the active stylus 100, and the system 1 according to the present embodiment, a data signal is configured in a format determined based on one or more pieces of individual interactive data that can be obtained by the stylus 100, making it possible to send one or more pieces of individual interactive data efficiently from the stylus 100 to the sensor controller 31. As a result, it becomes possible to flexibly deal with various functions of the stylus 100 as well as changes made to the functions by user operation. In particular, it becomes possible to flexibly deal with communication of the orientation OR, which shows which functions (e.g., presence/absence of a tilt detector, numbers of dimensions of parameters, meanings of parameter values) are supported at a present moment and which varies significantly depending on the type of the stylus 100.

Also, once the capability information CP is shared with the sensor controller 31, it is possible to notify the sensor controller 31 of the capability information CP by sending only the hash value CP_Hash rather than the entire capability information CP. As a result, even under a condition in which the stylus 100 frequently enters and leaves the sensing range SR in a repeated manner, the time required for the sensor controller 31 to identify the capability information CP can be shortened.

It also becomes possible to send a data signal including the interactive data DF at a fixed period T.

When the hash value CP_Hash is sent in step S8 in FIG. 11, the stylus 100 performs a process of deriving the hash value CP_Hash from the capability information CP prior to the transmission, and this derivation may be performed based on the entire capability information CP or based on only part thereof. A detailed description will be given below of the process of deriving the hash value CP_Hash based on only part of the capability information CP.

First, the capability information CP depicted in FIG. 5 includes first capability information that is not changed by user operation or setting from the sensor controller 31 and second capability information that can be changed by user operation or setting from the sensor controller 31. First capability information is, for example, information indicating types of sensors such as pen pressure sensor and angular sensor of the stylus 100; information indicating whether or not the stylus 100 has the barrel button 104 (information indicated by the number of barrel buttons BB depicted in FIG. 6; BB=0 indicates that the stylus 100 has no barrel button 104, and BB≠0 indicates that the stylus 100 has the barrel button(s) 104); information indicating whether or not the stylus 100 has an inclination detection sensor or a twist detection sensor (information indicated by the orientation code ORC depicted in FIG. 7; for example, ORC=1 indicates that the stylus 100 has no twist detection sensor, and ORC=2 indicates that the stylus 100 has a twist detection sensor); and information indicating whether or not the stylus 100 has any other sensor (information indicated by the custom data flag CDf depicted in FIG. 6). Information indicating whether the stylus 100 is capable of specifying the color of a line drawn by the stylus 100 (information indicated by the color Col depicted in FIG. 5) may also be included in first capability information. Although not depicted in FIG. 5 or other figures, the capability information CP can include information identifying the function assigned to each of the one or more barrel buttons 104. Such information may be a piece of first capability information. This information includes information for distinguishing between primary and secondary barrel buttons 104 when there are two barrel buttons 104, or information indicating that the style Styl turns into an eraser while the barrel button 104 is held pressed, for example.

On the other hand, second capability information includes information identifying, for example, the color and width of a line drawn by the stylus 100 or the brush type such as a pencil type and a ballpoint pen type. These are indicated by the color Col and the style Styl depicted in FIG. 5. Because the user identifier (UID) is information that may be used to identify inking information such as color and width, the user identifier (UID) may also be used as the second capability information.

When deriving the hash value CP_Hash, the stylus 100 may derive the hash value CP_Hash based only on the portion of the capability information CP relating to second capability information. This makes it possible to reduce the possibility that the same hash value CP_Hash may be derived for different pieces of the capability information CP (possibility that the hash values may collide). For example, it is possible to downsize information that serves as a source for deriving the hash value, as compared to when the hash value CP_Hash is derived based on the entire capability information CP, by deriving the hash value CP_Hash based only on the portion relating to the second capability information. The smaller the size of information that serves as a source for deriving the hash value, the smaller the possibility of collision between hash values. Therefore, it is possible to reduce the possibility of collision between hash values by taking the above measure.

On the other hand, when determining in step S23 depicted in FIG. 12 that no hash value matching the received hash value CP_Hash is stored in the associated data storage area, the sensor controller 31 may send a request to send the entire capability information CP to the stylus 100. It should be noted that this transmission should preferably be conducted by including the above request as a command in the beacon signal BS. When this request is received, it is only necessary for the stylus 100 to determine that the stylus 100 has yet to be paired in step S6 depicted in FIG. 11. Doing so makes it possible to send the entire capability information CP from the stylus 100 to the sensor controller 31.

Alternatively, the sensor controller 31 may decide not to accept part or whole of the capability information CP sent by the stylus 100 in accordance with its own resources, rather than unconditionally accepting the capability information CP. Still alternatively, the sensor controller 31 may determine the time slots to use for transmission of the data D on its own. A description will be given below in this regard with reference to FIG. 19.

Figure 19:
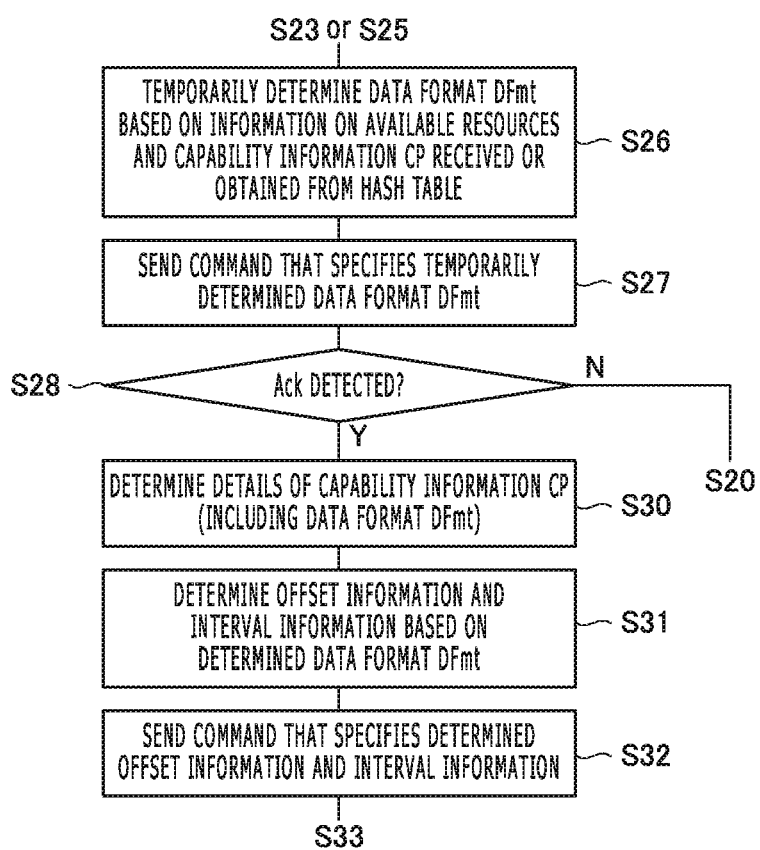
FIG. 19 is a diagram illustrating a modification example of the flow of operation of the sensor controller depicted in FIG. 12.

FIG. 19 is a diagram illustrating a modification example of the flow of operation of the sensor controller 31 depicted in FIG. 12. FIG. 19 depicts only an extracted part of the flow depicted in FIG. 12.

As illustrated in FIG. 19, when receiving all the capability information CP in step S25 or obtaining the capability information CP from the associated data storage area in step S23, the sensor controller 31 according to this modification example will temporarily determine the data format DFmt based on the received or obtained capability information CP and on information on available resources (step S26). Information on available resources refers, for example, to time slot vacancies. Then, the sensor controller 31 sends the command that specifies the temporarily determined data format DFmt to the stylus 100 as part of the beacon signal BS (step S27).

Thereafter, the sensor controller 31 attempts to detect the response signal Ack sent by the stylus 100 (step S28), and when the response signal Ack is not detected, the sensor controller 31 will bring its process back to step S20 depicted in FIG. 12 by assuming that the stylus 100 has moved out of the sensing range SR or did not accept the temporarily determined data format DFmt. On the other hand, when the response signal Ack is received in step S28, the sensor controller 31 will determine the details of the capability information CP (including the data format DFmt) based on the temporarily determined details (step S30).

After step S30, the sensor controller 31 determines offset information and interval information based on the determined data format DFmt (step S31). Offset information is information that indicates, of the plurality of time slots forming the frame F, those used to send at least part of the interactive data DF. More specifically, the offset information indicates the distance in time between the first time slot that sends the interactive data DF out of the plurality of time slots forming the frame F and the beginning of the frame F. In the examples illustrated in FIG. 15, FIG. 17, and FIG. 18, for example, the offset information is 2, and in the example illustrated in FIG. 16, the offset information is 3. On the other hand, interval information is information that indicates the transmission period of the interactive data DF. In the examples illustrated in FIG. 15 to FIG. 17, for example, the interval information is 4, and in the example illustrated in FIG. 18, the interval information is 8. In short, the offset information and the interval information specify when a certain piece of individual interactive data of the one or more pieces of individual interactive data is sent. The offset and interval information, together with the data format DFmt, defines the format that specifies the configuration of the data signal including the data D. Unlike the offset information, the interval information can be represented by how often the transmission is performed, and can be indicated by an identifier indicating the transmission period or how frequently the transmission is performed.

After determining offset information and interval information in step S31, the sensor controller 31 sends a command that indicates the determined offset information and interval information to the stylus 100 as part of the beacon signal BS (step S32). From this step onward, the stylus 100 sends the interactive data DF using the time slot indicated by the specified offset information and interval information.

As described above, the sensor controller 31 may decide on the capability information CP of the stylus 100 as well as the time slot to be used by the stylus 100 to send the data D. This way, the sensor controller 31 may take the initiative in communicating with the stylus 100.

A description will be given next of the system 1 according to a second embodiment of the present disclosure. The system 1 according to the present embodiment differs from the system 1 according to the first embodiment in that two hash values are used as hash values of the capability information CP. In the description given below, the same components as those in the first embodiment are denoted by the same reference symbols, and a description will be given with focus on differences from the first embodiment.

Figure 20:
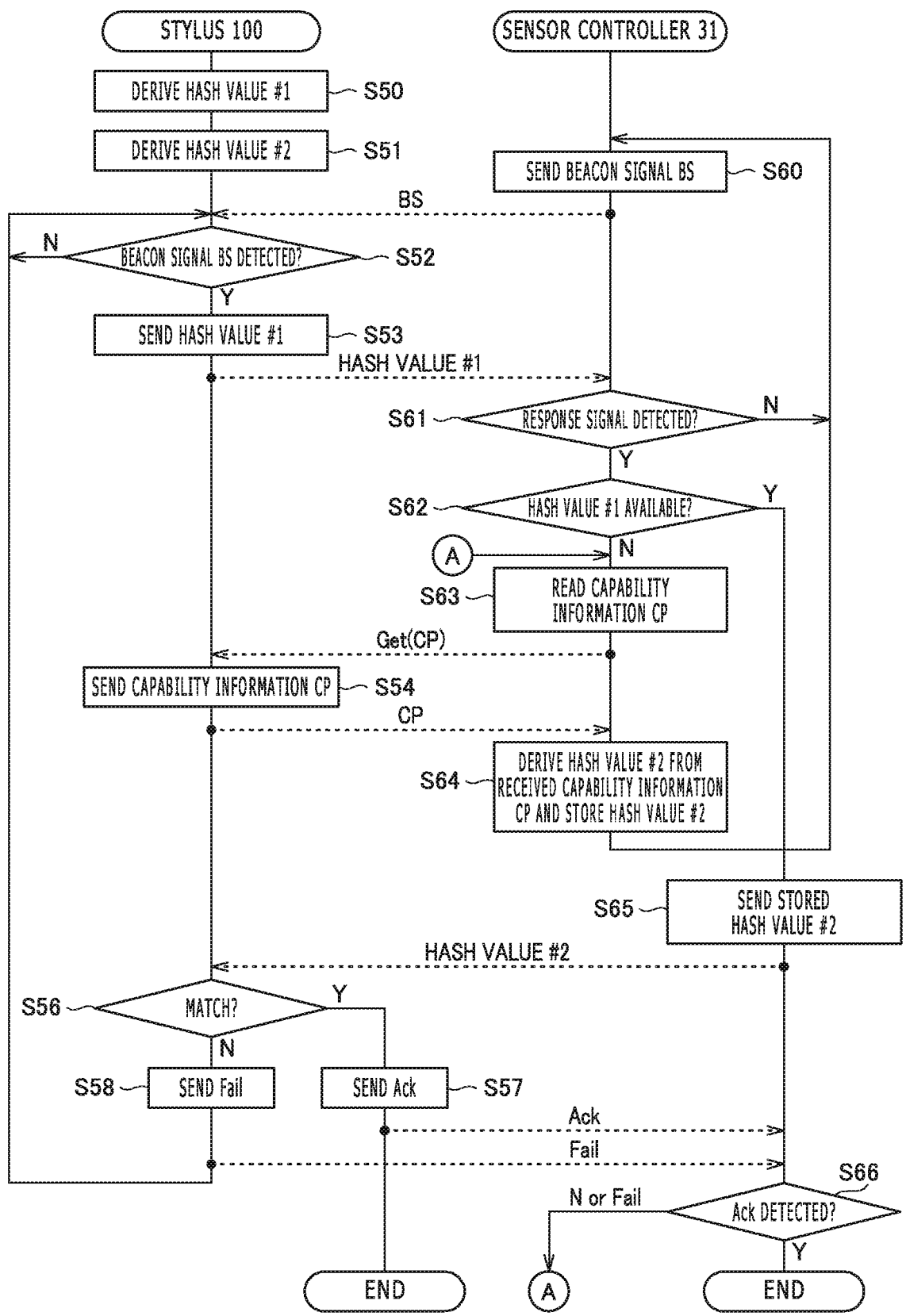
FIG. 20 is a diagram illustrating a flow of operation of the stylus and the sensor controller in a modification example using two kinds of hash values as hash values of the capability information CP.

FIG. 20 is a diagram illustrating a flow of operation of the stylus 100 and the sensor controller 31 according to the present embodiment. The same figure illustrates a flow of operation relating to the process in which the sensor controller 31 receives the capability information CP from the stylus 100. A description will be given below of the operation of the stylus 100 and the sensor controller 31 according to the present embodiment with reference to FIG. 20.

First, when power is turned on or a change that affects the hash value is made to the capability information CP (corresponds to affirmative determination in step S2 of FIG. 11), the stylus 100 will derive two hash values #1 and #2 (first and second hash values) based on its own capability information CP (steps S50 and S51). The two hash values #1 and #2 may be derived using two different kinds of hash functions (algorithms) such as 13-bit CRC and 16-bit FNV. Alternatively, higher and lower order bit strings of a hash value derived by a single hash function may be used respectively as the hash values #1 and #2. Another possible process is to derive the hash value #1 based on the first capability information described above and derive the hash value #2 based on the second capability information.

After entering the sensing range SR of the sensor controller 31 (refer to FIG. 1) and detecting the beacon signal BS sent by the sensor controller 31 (steps S60 and S52), the stylus 100 sends only the hash value #1 first (step S53). This transmission is conducted by including the hash value #1 in a response signal to the beacon signal BS.

When detecting the response signal to the beacon signal BS (step S61), the sensor controller 31 will extract the hash value #1 (or the information deemed to be the hash value #1) therefrom and determine whether or not the hash value #1 is stored in the associated data storage area (step S62). When not detecting the response signal in step S61, the sensor controller 31 will return to step S60 to send the beacon signal BS again in the next frame.

When determining in step S62 that the hash value #1 is not stored in the associated data storage area, the sensor controller 31 will read the capability information CP from the stylus 100 (step S63). This reading is conducted specifically by including a command Get (CP) indicating a request for the capability information CP in the beacon signal BS to be sent in the next frame. When the stylus 100 sends the capability information CP in response thereto (step S54), the sensor controller 31 derives the hash value #2 based on the received capability information CP and stores the hash value #2 in the associated data storage area in association with the received hash value #1 and capability information CP (step S64). It should be noted that the sensor controller 31 may derive the hash value #1 anew in this step S64.

On the other hand, when determining in step S62 that the hash value #1 is stored in the associated data storage area, the sensor controller 31 will read the hash value #2, stored in association with the received hash value #1, and send the hash value #2 to the stylus 100 (step S65). This transmission is also conducted by including the read hash value #2 in the beacon signal BS to be sent in the next frame. When receiving the hash value #2 sent as described above, the stylus 100 will determine whether or not the hash value #2 matches the hash value #2 derived in step S51 (step S56). When the two values match, the stylus 100 will send the response signal Ack, and when the two values do not match, the stylus 100 will send a fail signal Fail. These transmissions are conducted by including the response signal Ack or the fail signal Fail in a response signal to the beacon signal BS. Then, when sending the fail signal Fail, the stylus 100 will return to step S52 to continue with the processes, and when sending the response signal Ack, the stylus 100 will terminate the detection process of the sensor controller 31 to proceed with the data signal transmission process described above (processes from step S10 onward depicted in FIG. 11). The sensor controller 31 determines whether the response signal Ack has been detected in response to the hash value #2 sent in step S65 (step S66). When detecting the response signal Ack, the sensor controller 31 will terminate the detection process of the stylus 100 to proceed with the data signal reception process (processes from step S40 onward depicted in FIG. 12), and when not detecting the response signal Ack (or when detecting the fail signal Fail), the sensor controller 31 will return to step S63 and proceed with the capability information CP reading process again.

As described above, the system 1 according to the present embodiment allows the sensor controller 31 to reconfirm a match between the capability information CP stored in its own associated data storage area and the capability information CP available with the stylus 100 using the hash value #2 stored in association with the received hash value #1. This makes it possible to engage in communication using the correct capability information CP in a more reliable manner.

Although preferred embodiments of the present disclosure have been described above, the present disclosure is in no way limited by these embodiments, and it is a matter of course that the present disclosure can be carried out in various forms.

Figure 21:
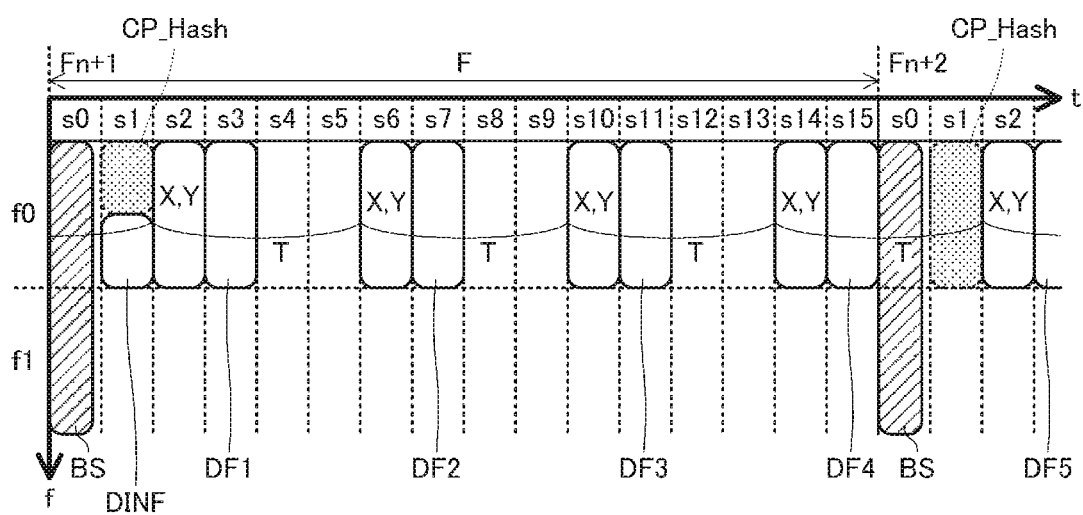
FIG. 21 is a diagram illustrating a modification example of allocation of time slots.

For example, although, in each of the above embodiments, the derivation of coordinate data (X,Y) indicating the position of the stylus 100 and the transmission of the interactive data DF and so on are conducted by using the same downlink signal DS, they may be accomplished by the different downlink signals DS as illustrated in FIG. 21. FIG. 21 depicts an example in which a position signal dedicated for deriving coordinate data (X,Y) and the interactive data DF are sent in two different downlink signals DS, respectively, in a time-divided manner. The sensor controller 31 derives coordinate data (X,Y) indicating the position of the stylus 100 based only on the first downlink signal DS, and thereafter suitably obtains the interactive data DF sent by the stylus 100. Also, each piece of the interactive data DF1 shown in FIG. 17 and FIG. 18 may be sent in time slots that are separate from a time slot including the position signal, as in the example depicted in FIG. 21.

DESCRIPTION OF REFERENCE SYMBOLS

1 System
3 Electronic apparatus
3a Touch surface
30 Sensor
30X,30Y Linear electrode
31 Sensor controller
32 System controller
40 Selecting circuit
41x,41y Conductor selection circuit
44x,44y Switch
49 Detecting circuit
50 Receiving circuit
50 Converter
51 Amplifying circuit
52 Detecting circuit
53 Analog-digital converter
60 Transmitting circuit
61 Control signal supply circuit
62 Switch
63 Direct spreading circuit
64 Spreading code holding circuit
65 Transmitting guard circuit
70 Logic circuit
100 Active stylus
101 Battery
102T,102R Electrode
103 Tail switch
104 Barrel button
105 Operation state detection circuitry
106 Stylus controller IC
110 Communication circuitry
111 Capability information updating circuitry
112 Interactive data acquisition circuitry
113 Noninteractive data acquisition circuitry
BB Barrel button state
BBN Number of barrel buttons
BL Battery level
BS Beacon signal
CBS Custom button size
CD Custom data
CDf Custom data flag
CDS Custom data size
Col Color
COS Custom orientation size
CP Capability information
CP_Hash Hash value of capability information
CPS Custom pen pressure size
D Data
DF Interactive data
DFmt Data format
DINF Noninteractive data
DS Downlink signal
F Frame
Inv Inversion
OCT Orientation code table OR Orientation
ORC Orientation code
ORR Orientation resolution
ORR Orientation resolution
PL Number of pen pressure reading levels
Rx Receiving circuit
SR Sensing range
Styl Style
TaP Tangential pen pressure value
TaPf Tangential pen pressure flag
TiP Pen pressure value
Tx Transmitting circuit

The invention claimed is:

1. A method of using an active stylus and a sensor controller that engage in two-way communication with each other, the method comprising:
the sensor controller sending a beacon signal indicating reference time of a frame used to carry out the two-way communication;
the active stylus, after detecting the beacon signal, sending, included in a response signal to the beacon signal, information associated with capability information indicating a type of one or more pieces of interactive data that can be obtained by the active stylus, wherein the capability information includes information related to a format indicative of a data size to be used by the active stylus to send the one or more pieces of interactive data to the sensor controller; and
the active stylus, in response to continuing to detect an uplink signal transmitted from the sensor controller, periodically sending a data signal that includes at least part of the one or more pieces of interactive data and that is configured in the data size indicated by the format.

2. The method according to claim 1, further comprising:
the sensor controller determining the format based on the capability information obtained from the response signal.

3. The method according to claim 2, comprising:
the sensor controller determining, based on the format, offset information that indicates, of a plurality of time slots forming the frame, a time slot used to send at least part of the interactive data; and
the active stylus sending the data signal using the time slot indicated by the offset information.

4. The method according to claim 3, comprising:
the sensor controller determining, based on the format, interval information that indicates a transmission period of at least part of the interactive data; and
the active stylus sending the data signal using time slots indicated by the offset information and the interval information.

5. The method according to claim 1, wherein
the format specifies which piece of interactive data of the one or more pieces of interactive data is sent and when this piece of interactive data is sent.

6. The method according to any one of claim 1, wherein
the beacon signal, the response signal, and the data signal are included in this order in the frame.

7. The method according to claim 6, further comprising:
the sensor controller including a request for one or more pieces of noninteractive data, which need not be received as frequently as the one or more pieces of interactive data, in the beacon signal; and
the active stylus sending a data signal including the one or more pieces of noninteractive data in response to the request for one or more pieces of noninteractive data.

8. The method according to claim 7, wherein
the interactive data includes a pen pressure value and a pressed state of a button, and
the noninteractive data includes a battery level of the active stylus.

9. The method according to claim 1, wherein
the capability information includes first capability information that is not changed by user operation or by setting of the sensor controller.

10. The method according to claim 9, wherein
the first capability information includes information indicating types of sensors included in the active stylus.

11. The method according to claim 10, wherein
the first capability information includes information indicating whether or not the active stylus has a barrel button, whether or not the active stylus has an inclination detection sensor, whether or not the active stylus has a twist detection sensor, and whether or not the active stylus has any other sensor.

12. The method according to claim 9, wherein
the first capability information includes information indicating whether or not the active stylus has a function to specify color of a line drawn by the active stylus.

13. The method according to claim 1, wherein
the capability information includes second capability information that can be changed by user operation or by setting of the sensor controller.

14. The method according to claim 13, wherein
the second capability information includes information identifying color, width, and a type of a line drawn by the active stylus.

15. The method according to claim 13, wherein
the second capability information includes information identifying a function assigned to each of one or more buttons on the active stylus.

16. The method according to claim 1, wherein
the information associated with the capability information is a hash value derived based on a whole or a part of the capability information,
the sensor controller stores the hash value in association with the capability information, and
the sensor controller obtains the capability information in response to receiving the response signal that includes the hash value.

17. The method according to claim 16, further comprising:
the sensor controller including a request to send the entire capability information in the beacon signal; and
the active stylus, when receiving the request to send the entire capability information, sending, included in the response signal to the beacon signal, the capability information.

18. The method according to claim 16, wherein
the capability information includes second capability information that can be changed by user operation or by setting of the sensor controller, and
the hash value is derived based on the second capability information.

19. The method according to claim 16, further comprising:
the active stylus generating first and second hash values based on at least part of the capability information, wherein
the information associated with the capability information is the first hash value.

20. The method according to claim 19, further comprising:

the sensor controller generating the second hash value based on at least part of the capability information, wherein of the sensor controller stores the first and second hash values in association with the capability information, and the sensor controller obtains the capability information and the second hash value in response to receiving the response signal that includes the first hash value and sends the obtained second hash value to the active stylus.

21. The method according to claim 1, wherein the two-way communication is communication through capacitive coupling.

22. A sensor controller that engages in two-way communication with an active stylus, comprising:

transmission circuitry which, in operation, sends a beacon signal indicating reference time of a frame used to carry out the two-way communication, reception circuitry which, in operation, receives, from the active stylus, a response signal including information associated with capability information indicating a type of one or more pieces of interactive data that can be obtained by the active stylus, wherein the capability information includes information related to a format indicative of a data size to be used by the active stylus to send the one or more pieces of interactive data to the sensor controller, wherein the sensor controller periodically receives, from the active stylus which continues to detect an uplink signal transmitted from the sensor controller, a data signal that includes at least part of the one or more pieces of interactive data and that is configured in the data size indicated by the format.

23. A system for two-way communication, comprising:

a sensor controller which, in operation, sends a beacon signal indicating reference time of a frame used to carry out the two-way communication, and an active stylus which, after detecting the beacon signal, sends, included in a response signal to the beacon signal, information associated with capability information indicating the type of one or more pieces of interactive data that can be obtained by the active stylus wherein the capability information includes information related to a format indicative of a data size to be used by the active stylus to send the one or more pieces of interactive data to the sensor controller, and, in response to continuing to detect an uplink signal transmitted from the sensor controller, periodically sends a data signal that includes at least part of the one or more pieces of interactive data and that is configured in the data size indicated by the format.

* * * * *